(12) United States Patent
Santin et al.

(10) Patent No.: US 8,099,837 B2
(45) Date of Patent: Jan. 24, 2012

(54) LOW-PROFILE UPHOLSTERY CLIP FOR ATTACHING A BEAD TO A FOAM SUBSTRATE

(75) Inventors: Andrew W. Santin, Newton, MA (US); Pasquale Rossi, Sarnia (CA); David F. Jones, Northboro, MA (US); Timothy E. T. Scott, Mississauga (CA)

(73) Assignee: Hope Global, division of NFA Corporation, Cumberland, RI (US)

( * ) Notice: Subject to any disclaimer, the term of this patent is extended or adjusted under 35 U.S.C. 154(b) by 786 days.

(21) Appl. No.: 11/851,822

(22) Filed: Sep. 7, 2007

(65) Prior Publication Data
US 2009/0064471 A1 Mar. 12, 2009

(51) Int. Cl.
*A47C 31/04* (2006.01)
(52) U.S. Cl. ........... 24/297; 24/543; 248/73; 297/218.2; 297/452.6; 428/100
(58) Field of Classification Search ............ 24/454, 24/335, 336, 339, 452, 297, 298, 302, 581.11, 24/543; 248/74.4, 74.3, 68.1, 74.1, 75, 62, 248/74.2, 316.7; 211/60.1; 428/100; 297/218.2, 297/452.6, 452.13
See application file for complete search history.

(56) References Cited

U.S. PATENT DOCUMENTS

| | | | |
|---|---|---|---|
| 316,062 A * | 4/1885 | Riessner | 211/65 |
| 2,448,900 A * | 9/1948 | Mayo | 211/51 |
| 3,632,164 A | 1/1972 | Radke | |
| 3,649,974 A | 3/1972 | Baruth et al. | |
| 3,747,178 A | 7/1973 | Harder | |
| 3,794,378 A | 2/1974 | Haslam et al. | |
| 3,807,675 A * | 4/1974 | Seckerson et al. | 248/73 |
| 3,981,534 A | 9/1976 | Wilton | |
| 3,988,034 A | 10/1976 | Fister | |
| 3,995,892 A | 12/1976 | Hellman et al. | |
| 4,114,241 A * | 9/1978 | Bisping | 403/188 |
| 4,306,697 A * | 12/1981 | Mathews | 248/68.1 |
| 4,470,179 A * | 9/1984 | Gollin et al. | 24/543 |
| 4,663,211 A | 5/1987 | Kon | |
| 4,673,542 A | 6/1987 | Wigner et al. | |
| 4,861,104 A | 8/1989 | Malak | |
| 4,881,997 A | 11/1989 | Hatch | |
| 4,933,224 A | 6/1990 | Hatch | |

(Continued)

FOREIGN PATENT DOCUMENTS

CA 2165930 A1 6/1996

(Continued)

*Primary Examiner* — Robert Sandy
*Assistant Examiner* — Rowland D Do
(74) *Attorney, Agent, or Firm* — William A. Loginov, Esq.; Loginov & Associates, PLLC

(57) ABSTRACT

A low-profile clip adapted to secure a listing bead to a foam substrate and is constructed from a material that affords resilience, durability, high resistance to a wide range of temperatures during field use and seat assembly and ease of bead installation with high pull-out strength. The clip includes a base and a pair of legs extending upwardly from the base to a top barb. In this embodiment, the legs each extend upwardly from the base at a first angle of approximately 80 to 85 degrees and therefrom to each of the respective barbs at a second angle, with respect to a plane parallel to the base of approximately 88 to 90 degrees. In this manner the clip exhibits high performance while defining an overall height from tops of the legs to a bottom of the base of approximately ten millimeters or less making the clip particularly desirable for use in modern, thinner foam substrates.

30 Claims, 23 Drawing Sheets

U.S. PATENT DOCUMENTS

| | | | |
|---|---|---|---|
| 4,988,282 A | 1/1991 | Fukui | |
| 5,005,242 A | 4/1991 | Kennedy et al. | |
| 5,013,090 A | 5/1991 | Matsuura | |
| 5,023,125 A | 6/1991 | Gray | |
| 5,028,472 A | 7/1991 | Gray | |
| 5,110,649 A | 5/1992 | Morse et al. | |
| 5,180,618 A | 1/1993 | Kessler et al. | |
| 5,236,243 A | 8/1993 | Reyes | |
| 5,259,905 A | 11/1993 | Gilcreast | |
| 5,273,597 A | 12/1993 | Kumagai et al. | |
| 5,286,431 A | 2/1994 | Banfield et al. | |
| 5,326,151 A | 7/1994 | Smith et al. | |
| 5,338,092 A | 8/1994 | Wiltsey et al. | |
| 5,342,569 A | 8/1994 | Murasaki | |
| 5,401,075 A | 3/1995 | Venuto et al. | |
| 5,459,907 A | 10/1995 | Nivet | |
| 5,582,463 A | 12/1996 | Linder et al. | |
| 5,605,373 A | 2/1997 | Wildern et al. | |
| 5,641,552 A | 6/1997 | Tillner | |
| 5,658,046 A | 8/1997 | Rus | |
| 5,718,478 A | 2/1998 | Allison | |
| 5,733,001 A | 3/1998 | Roberts | |
| 5,766,723 A | 6/1998 | Oborny et al. | |
| 5,786,061 A | 7/1998 | Banfield | |
| 5,827,546 A | 10/1998 | Burchi et al. | |
| 5,827,547 A | 10/1998 | Burchi et al. | |
| 5,882,073 A | 3/1999 | Burchi et al. | |
| 5,900,303 A | 5/1999 | Billarant | |
| 6,009,676 A | 1/2000 | Feldpausch et al. | |
| 6,109,569 A * | 8/2000 | Sakaida | 248/75 |
| 6,173,545 B1 | 1/2001 | Feldpausch et al. | |
| 6,177,155 B1 | 1/2001 | Kurosaki | |
| 6,397,638 B1 | 6/2002 | Roell | |
| 6,406,093 B1 | 6/2002 | Miotto et al. | |
| 6,431,585 B1 | 8/2002 | Rickabus et al. | |
| 6,592,181 B2 | 7/2003 | Stiller et al. | |
| 6,656,563 B1 | 12/2003 | Leach et al. | |
| 6,668,429 B2 | 12/2003 | Fujisawa et al. | |
| 6,838,155 B2 | 1/2005 | Cappucci et al. | |
| 6,969,832 B1 * | 11/2005 | Daughtry, Sr. | 219/531 |
| 7,444,792 B2 * | 11/2008 | Matson | 52/698 |
| 7,487,575 B2 * | 2/2009 | Smith | 24/297 |
| 2001/0007166 A1 | 7/2001 | Shimamura et al. | |
| 2002/0101109 A1 | 8/2002 | Stiller et al. | |
| 2003/0001421 A1 | 1/2003 | Schmidt | |
| 2003/0072912 A1 | 4/2003 | Itoh et al. | |
| 2003/0134083 A1 | 7/2003 | Wang et al. | |
| 2003/0162008 A1 | 8/2003 | Cappucci et al. | |
| 2003/0204939 A1 | 11/2003 | Fujisawa et al. | |
| 2003/0213105 A1 | 11/2003 | Bednarski | |
| 2003/0215601 A1 | 11/2003 | Pedde | |
| 2003/0236315 A1 | 12/2003 | Xie et al. | |
| 2003/0236316 A1 | 12/2003 | Heumen et al. | |
| 2004/0061254 A1 | 4/2004 | Snooks | |
| 2004/0064894 A1 | 4/2004 | Labish | |
| 2004/0082674 A1 | 4/2004 | Smith et al. | |
| 2004/0137192 A1 | 7/2004 | McVicker | |
| 2004/0195877 A1 | 10/2004 | Demain et al. | |
| 2005/0006944 A1 | 1/2005 | Ali | |

FOREIGN PATENT DOCUMENTS

| | | |
|---|---|---|
| CA | 2368739 A1 | 7/2002 |
| CA | 2420373 AA | 8/2003 |
| CA | 2427371 A1 | 11/2003 |
| DE | 4446450 C1 | 4/1996 |
| DE | 19530397 A1 | 2/1997 |
| DE | 19734408 A1 | 2/1999 |
| DE | 29821697 U1 | 3/1999 |
| DE | 29822649 | 5/1999 |
| DE | 29917372 U1 | 2/2000 |
| DE | 19949423 C1 | 1/2001 |
| DE | 19959235 A1 | 6/2001 |
| EP | 0421258 A1 | 9/1990 |
| EP | 0532820 A1 | 3/1993 |
| EP | 0433100 B1 | 4/1994 |
| EP | 0439969 B1 | 7/1994 |
| EP | 0537333 A1 | 9/1995 |
| EP | 070800 A2 | 4/1996 |
| EP | 0727294 A1 | 8/1996 |
| EP | 0667257 B1 | 7/1998 |
| EP | 0720900 B1 | 3/1999 |
| EP | 0960782 A1 | 12/1999 |
| EP | 0990554 A1 | 5/2000 |
| EP | 1000855 A2 | 5/2000 |
| EP | 1116450 A2 | 7/2001 |
| EP | 0900030 B1 | 7/2002 |
| EP | 1243462 A2 | 9/2002 |
| EP | 0990546 B1 | 3/2003 |
| EP | 1300229 A1 | 4/2003 |
| EP | 0960783 B1 | 6/2003 |
| EP | 1358326 A1 | 11/2003 |
| EP | 0960782 B1 | 1/2004 |
| EP | 1000856 B1 | 1/2004 |
| EP | 1220628 B1 | 5/2004 |
| GB | 1560234 B1 | 1/1980 |
| GB | 2238708 A1 | 6/1991 |
| WO | 8603164 A1 | 6/1986 |
| WO | 9219119 | 11/1992 |
| WO | 9501741 A1 | 1/1995 |
| WO | 9720690 A1 | 6/1997 |
| WO | 9805232 A1 | 2/1998 |
| WO | 9820766 A1 | 5/1998 |
| WO | 0100386 A1 | 1/2001 |
| WO | 0124665 A1 | 4/2001 |
| WO | 0189338 A2 | 11/2001 |
| WO | 0205686 A2 | 1/2002 |
| WO | 03031223 A1 | 4/2003 |
| WO | 03058005 A2 | 7/2003 |
| WO | 03059111 A1 | 7/2003 |
| WO | 03070509 A2 | 8/2003 |
| WO | 03072390 A1 | 9/2003 |
| WO | 2004028789 A1 | 4/2004 |
| WO | 2004058496 A1 | 7/2004 |
| WO | WO2007008662 A2 | 1/2007 |

* cited by examiner

LOW-PROFILE UPHOLSTERY CLIP FOR ATTACHING A BEAD TO A FOAM SUBSTRATE

RELATED APPLICATIONS

This application is related to U.S. patent application Ser. No. 11/737,362, entitled FESTOONED TRIM CLIP SYSTEM AND METHOD FOR ATTACHING FESTOONED CLIPS TO A SUBSTRATE, by Andrew W. Santin, et al., the teachings of which are expressly incorporated herein by reference.

FIELD OF THE INVENTION

This invention relates to trim and upholstery attachment mechanisms, and more particularly to clips for attaching trim and upholstery to foam and other resilient or flexible substrates.

BACKGROUND OF THE INVENTION

Modern fabric trim covers and their interconnected spring and cushion components (collectively termed "upholstery"), such as those used in vehicles, often carefully sculpted and shaped to produce a comfortable and aesthetically pleasing effect. As such, the fabric (typically cloth, vinyl or leather with an appropriate backing material) is secured at many locations along its surface to a resilient or flexible backing that defines the cushioned substrate of the upholstered item (for example, a seat bottom, cushion, back or headrest). The substrate is typically constructed from a resilient material. This resilient/flexible material can be synthetic foam (for example polyurethane and/or isocyanate-based foam) or another cushioning material, such as traditional rubberized horsehair, hog hair, and the like. In general, the close-fitting appearance of the upholstery to the substrate requires that the fabric be tacked down to the substrate at any intermediate dips, Vees or trenches in the surface. Otherwise, the fabric will tend to billow or "tent" at these non-planar surface features.

Traditional methods for tacking down trim covers at trenches entail the use of a plastic bead along the inner side of the trim cover. This bead is often located at an inner seam that is a sewn or welded, or otherwise adhered, joint between fabric pieces. Likewise the foam substrate includes an exposed metal wire that may be molded into the substrate along a trench in its surface during its construction. So-called "hog-rings," consisting of bendable metal ringlets, are then secured to both the plastic bead and the metal wire. These rings are each applied by a tool, such as a hog-ring gun from a supply of wire. As each hog ring is secured, it forms an immovable, permanent joint between the fabric and the substrate. Clearly, this permanent joint is difficult to repair if needed and requires significant skill to create in the first place. In addition, this method of seat cover attachment leads to the development of injuries, such as carpal tunnel syndrome in employees who operate the hog ring tool over an extended period of time. Finally, the use of metal components may be undesirable where the seat includes electrical heating elements due to the metal's predisposition to conduct both heat and electricity.

More recently, trim covers have been secured to resilient substrates using detachable connections that allow repairs to be effected and are often more-easily applied without the used of highly skilled labor. In one example, one side of a hook and loop fastener is attached to a trench in the resilient substrate. The inner surface of the trim cover carries the opposing side of the fastener. This approach is reliable, but expensive, in terms of material wasted and consumed to attain a secure fit. It also requires a rather large-width trench to be formed in the resilient substrate to ensure a sufficient area of engagement between fastener sides.

Another recent approach involves the used of a series of clips that are molded into the trench as a foam substrate is manufactured. A version of this structure, and other prior art attachment mechanisms, are described in U.S. Published Patent Application US/2003/0215601 A1, entitled ATTACHMENT DEVICE, dated Nov. 20, 2003, by Peede, et al. the teachings of which are expressly incorporated herein by reference. A simplified version of such a clip and its use are shown in FIGS. 1-3 herein. As shown particularly in FIGS. 1 and 2, each clip 100 includes a pair of outwardly facing (with respect to the trim-cover-facing surface of the substrate) legs 102 that together form a female projection 104 with a pair of upper hooks or barbs 106 that face toward each other, thereby defining a top-end funnel, leading into a cavity 10. The barbs 106 define a narrow gap 112 therebetween. This gap 112 is smaller in width than the width of the cavity 110. The material and relative thickness of the legs 102 is such that the barbs 106 can be spread elastically apart so that an appropriately sized cylinder can pass between the legs to be thereafter trapped in the cavity against outward movement by the sprung-back barbs 106. In this case, the cylinder is the covered plastic or metal bead 120 (also known generally as "listing") attached to a seam 122 between two trim cover fabric pieces 124 and 126. This bead assembly is also known as "listing" in the industry. In this example, the bead 120 is surrounded by a piece of non-woven covering 130 that retains the bead against the bottom of the seam 122 using stitching 132 (or another attachment mechanism). Collectively the diameter of the bead 120 and covering 130 define an outer diameter ODB approximately equal to, or slightly less than, the lateral width WB of the cavity 110. Thus, in operation, an installer need only press the bead 120 down between the barbs 106 (arrow 140) so that the angled funnel tops of the barbs cause the legs 102 to spread, allowing the bead 120 to pass therebetween. Once the bead 120 passes fully between the barbs 106, then the bead 120 is mechanically retained beneath the barbs 106 within the cavity, and the seam 122 (and facing cover 130), extend through the gap 112 to hold that particular part of the trim cover (124 and 126) against the clip 100.

The clip includes a base 150 having a relatively thin cross section and an increased surface area adapted to act as an anchor within the (foam) substrate material 252. As shown (FIG. 2), the base is disposed beneath the surface of a trench 254. The base is locked into the matrix of the substrate as a result of the molding process in which foam covers the base and adheres to the base's material. Typically, the clip 100 is mounted in the bottom of a trench 254 as shown. In this manner, sufficient setback is provided to allow the seam 122 to sink into the substrate for a taut fit against its surface.

FIG. 3 shows an exemplary vehicle seat foam cushion 310 according the prior art. A plurality of clips 100 are located along the trench at an appropriate degree of spacing so as to ensure that the bead of the trim cover defines a continuous, unsegmented shape. In the example of a seat bottom or back, approximately 12-30 clips may be needed to define a desired shape. In general, the tighter the curvature of the substrate, the smaller the clip spacing provided. The above-referenced published U.S. patent application contemplates that the spacing between clips can be regulated, in part, by providing fixed-space, flexible connectors between individual clips and molding such clips into the foam substrate with the predetermined spacing defined by the connectors.

The above-described prior art clips are typically constructed from a resilient material, which allows for the flexure imparted by insertion of the listing bead into their respective cavities. However, these clips should also adhere firmly to the foam or other resilient substrate material. Hence, the clip material should exhibit properties so that it appropriately adheres to the substrate so that it will not eventually detach under long-term use. Many polymeric materials, however, are not capable of enduring the requisite range of operating temperatures to which a vehicle interior and the underlying clips may be exposed—for example, during molding and roll-forming of the foam. In general, a clip may experience temperatures as low, or lower than −40 F and as high as 180 F, or higher.

It should be noted also, that the process of inserting clips into a foam mold cavity, used for example to form seat parts, is typically a manual operation that is time-consuming, labor-intensive and sometimes subject to inaccurate placement. Clips are dispensed from inside loosely packed boxes, and each one must be individually picked, reoriented properly, and inserted into the appropriate location in the mold cavity for subsequent foam application thereover. This process contains inherent inefficiencies that the worker cannot fully overcome. Moreover, loosely packing ganged groups of clips, connected by intermediate connecting segments further complicates handling. It has been found that a loosely packed supply of ganged clips generally assumes a "bird's nest" entanglement that is extremely difficult to unravel. This problem is addressed in the above-incorporated, commonly assigned, U.S. patent application Ser. No. 11/737,362, entitled FESTOONED TRIM CLIP SYSTEM AND METHOD FOR ATTACHING FESTOONED CLIPS TO A SUBSTRATE by providing an effective and novel system and method for joining groups or continuous chains of "festooned" clips together for dispensing to workers and automated devices. This system and method allows the festooned clips to be pulled apart rapidly for insertion into a foam mold cavity.

A significant and increasing concern in the construction and installation of foam-mounted automotive upholstery clips relates to the overall height of the clip with respect to the foam cushion substrate. Improvements in manufacturing processes and foam formulations have allowed the thickness of the foam layer to be reduced in recent years. Such a reduction saves material, thereby reducing costs and decreasing waste at the end of the seat's product life. Reducing cushion thickness also allows for more accurate conformance of the cushion and overlying upholstery to a complex seat contour (e.g. avoiding an overstuffed and/or billowing appearance for the seat). However, thinner foam layers cause conventional height clips (typically 13 millimeters, or higher, from base to top) may protrude visibly from the foam layer when upholstered, and/or become noticeable as a hard, pointy protuberance to a seated individual—particularly an individual of heightened body weight. This may sometimes be referred to as the "princess-and-the-pea" effect.

Simply reducing the height of an existing clip is not a trivial exercise. The materials, dimensions and geometry employed for the clip may not accommodate a smaller-length leg. That is, the shorter the clip leg, the more force that is required to spread the barbs to receive a listing. The legs must exhibit a reasonable pull-out force over a wide range of temperatures (as above) to prevent the seat from detaching. Likewise, the legs and barbs must allow the listing to be passed therethrough during the upholstery-attachment process with the application of reasonably low force by a worker or robot—so as to prevent fatigue to the worker and/or damage to the seat and upholstery. Hence, selection of materials, dimensions and relative geometry between clip components is critical and necessitates a novel approach to the lowered-height-clip's design.

Accordingly, it is desirable to provide a lower-profile automotive upholstery clip that exhibits good chemically activated adhesion to foam, resilience and holding strength over a wide range of field operating temperatures, resistance to breakage during installation of listing beads—while requiring relatively low push-in force to be exerted by the worker. This clip design should lend itself to a variety of multi-clip ganging and festooning arrangements (as described below) so as to make dispensing and installation of the clip easier and more cost-effective.

SUMMARY OF THE INVENTION

This invention overcomes the disadvantages of the prior art by providing a low-profile clip adapted to secure a listing bead to a foam substrate. Such a low-profile clip employs a novel geometry and is constructed from a material that affords resilience, durability, high resistance to a wide range of temperatures during field use and seat assembly and ease of bead installation with high pull-out strength. In an illustrative embodiment, the clip includes a base and a pair of legs extending upwardly from the base and defining therebetween a central region constructed and arrangement to capture the listing bead. Each of the legs extends upwardly from the base to a top barb that defines a gap narrower than central region. In this embodiment, the legs each extend outwardly and vertically upwardly from the base at a first angle of approximately 80 to 85 degrees, and relative to the horizontal plane of the base to each of the respective barbs at a second angle, with respect to a line parallel to the base of approximately 88 to 90 degrees. Each of the legs has an approximate thickness taken along a direction of the parallel line of between approximately 1.0 and 2.0 millimeters. In this manner the clip exhibits high performance while defining an overall height from tops of the legs to a bottom of the base of approximately ten millimeters or less making the clip particularly desirable for use in modern, thinner foam substrates.

In an illustrative embodiment, each of the barbs are free of upward extensions and define each of a pair of sloping top surfaces directed downwardly toward the gap and the base. Notably, the bottom surface of each of the barbs defines an angle that is approximately the same as an angle of an engaging surface of the listing bead. The clip is constructed from a blended polycarbonate material, which provides good performance characteristics and exhibits good chemical adhesion to liquid foam.

According to further embodiments of the invention, the low-profile clip can be a standalone, single-clip-element unit, or can implemented as part of a single or multi-ganged clip that can be grouped into a festooned arrangement. That is, a plurality of clips are arranged together into a discrete assembly along a line of extension so that a human or automated handler can retrieve a grouping, separate one-clip-at-a-time from the grouping, and apply the separated clip to a mold cavity or other assembly structure. Each clip can include a base with opposing ends aligned in the direction of extension and transverse to an elongation direction for a connecting segment (if any) between ganged clip members. In an illustrative embodiment, these base ends include opposing male and female connectors. In this embodiment the male connector is a cylinder with an axis that extends transverse to the direction of elongation and the female connector defines a conforming cylindrical inner diameter, which allows it to nest over the male cylinder. A gap opening is provided at the far edge of the female connector to provide clearance for the base that connects the male cylinder to the clip member base end. This gap can be sized to allow a predetermined range of angular rotation of the male connector about its axis within the female connector. Clips can be stored as discrete groupings that are stacked in a container or paid out in a continuous grouping from a spool.

In an alternate embodiment, the male connector can be side braces that extend from the clip member's base end and thereby define a slot between the base end and the male cylinder. The female connector can be sized in lateral width and thickness to ride within the slot as the adjoining clips are angularly rotated with respect to each other. This arrangement affords a greater range or bending that can be useful in continuous feed implementations. The bases of clip members can be provided with holes that are engaged by a tractor pin-feed mechanism, or another drive formation can be provided to the clips. Any of the clips contemplated herein can be assembled into unitary or detachable multi-ganged arrangements of clip members separated by (narrowed) connecting segments. In a dual ganged configuration, male and female connectors on opposing clip members of a given clip can be located on opposite base end sides, thereby allowing clips to be attached to each other ambidextrously.

BRIEF DESCRIPTION OF THE DRAWINGS

The invention description below refers to the accompanying drawings, of which.

DETAILED DESCRIPTION

I. Festooned Clip Arrangements

Figure 1:
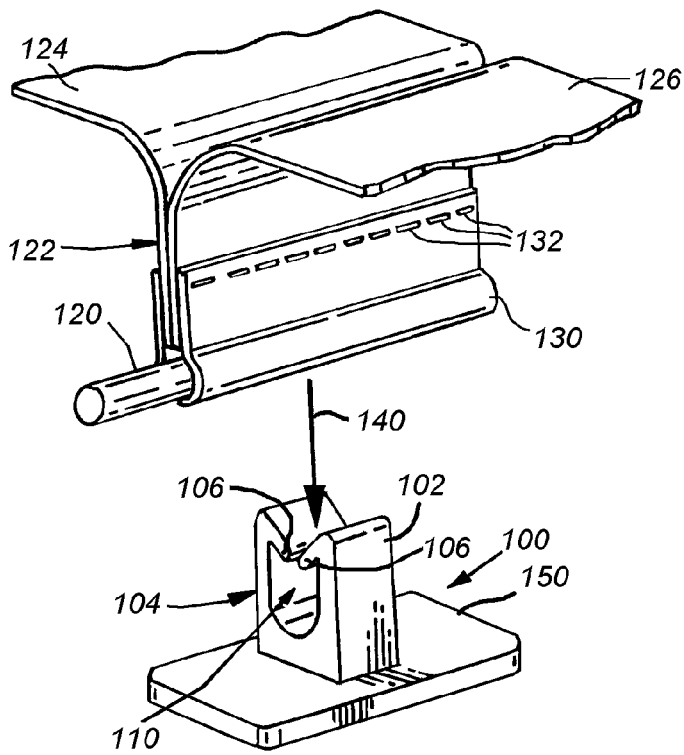
FIG. 1, already described, is an exploded fragmentary perspective view of a trim cover bead and clip according to the prior art.
Figure 2:
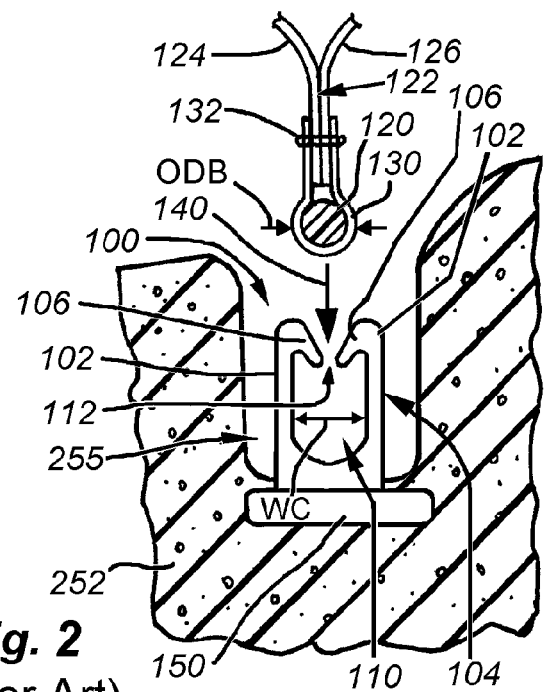
FIG. 2 is, already described, is a fragmentary side cross section of the clip and trim cover bead of FIG. 1 mounted in an exemplary substrate trench.
Figure 3:
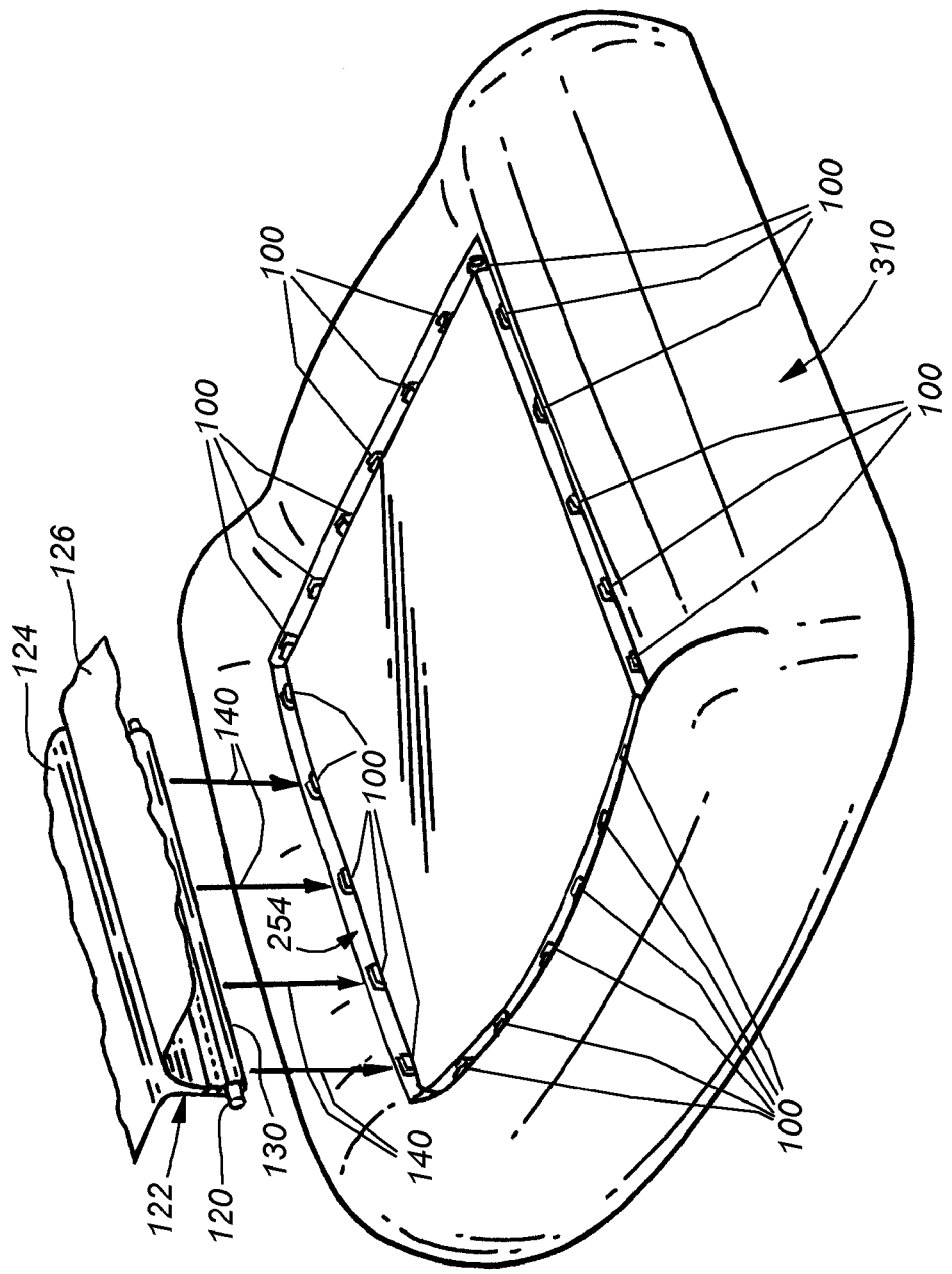
FIG. 3, already described, is a fragmentary perspective view of an exemplary substrate (a seat bottom) having a surrounding inboard trench with a plurality of clips molded thereinto and receiving a piece of a trim cover bead.
Figure 4:
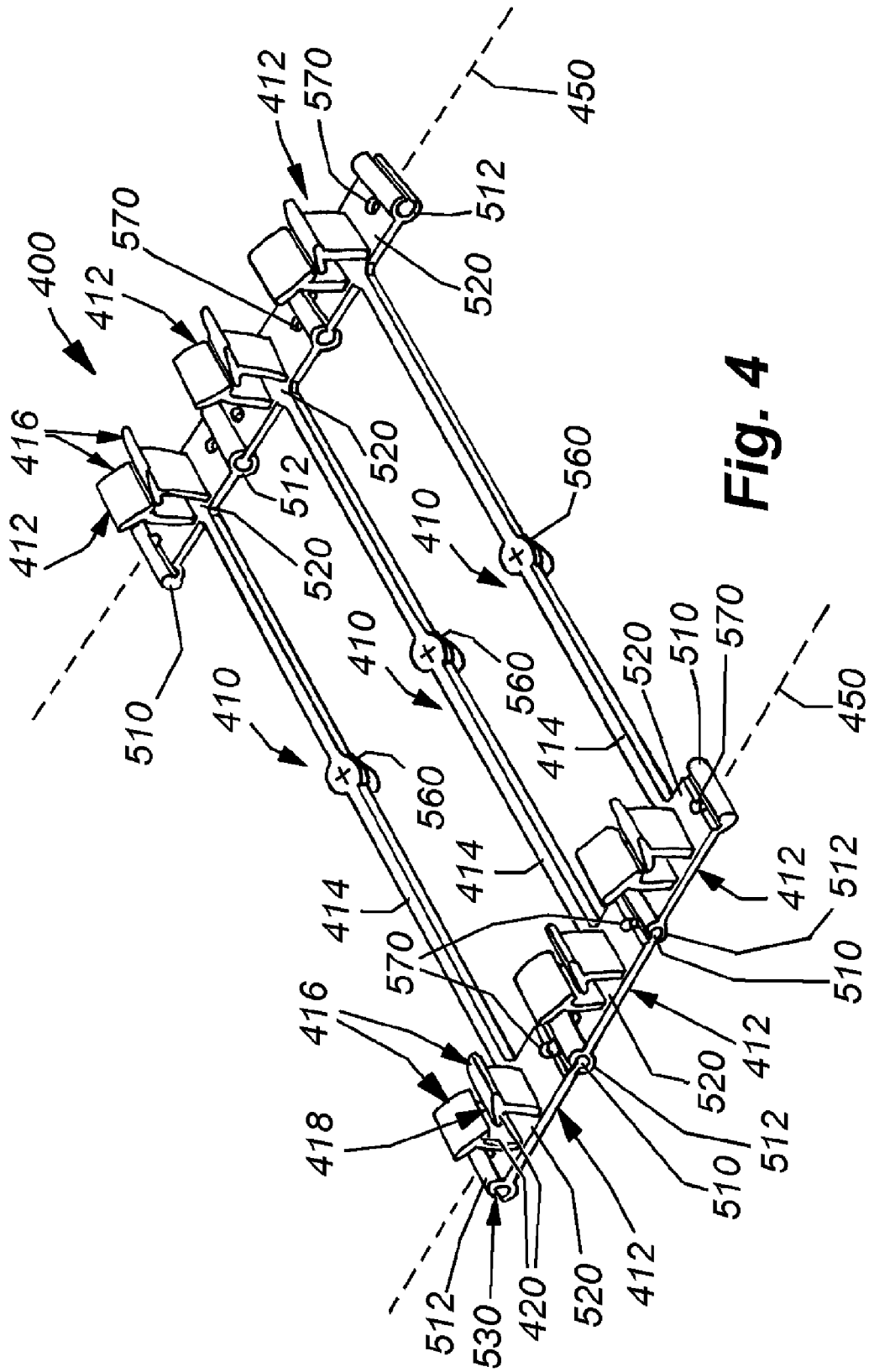
FIG. 4 is a perspective view of an exemplary festooned grouping of a plurality of dual-ganged clips according to an embodiment of this invention.
Figure 5:
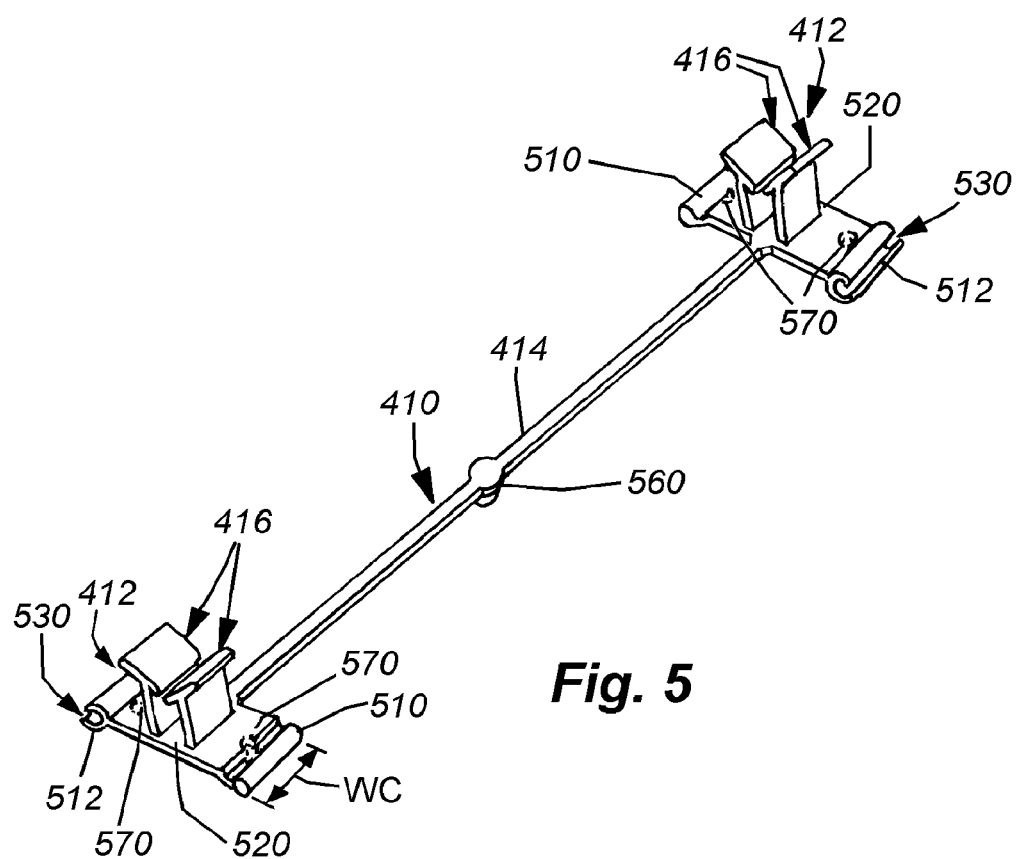
FIG. 5 is a perspective view of a single dual-ganged clip from the festooned grouping of FIG. 4.
Figure 6:
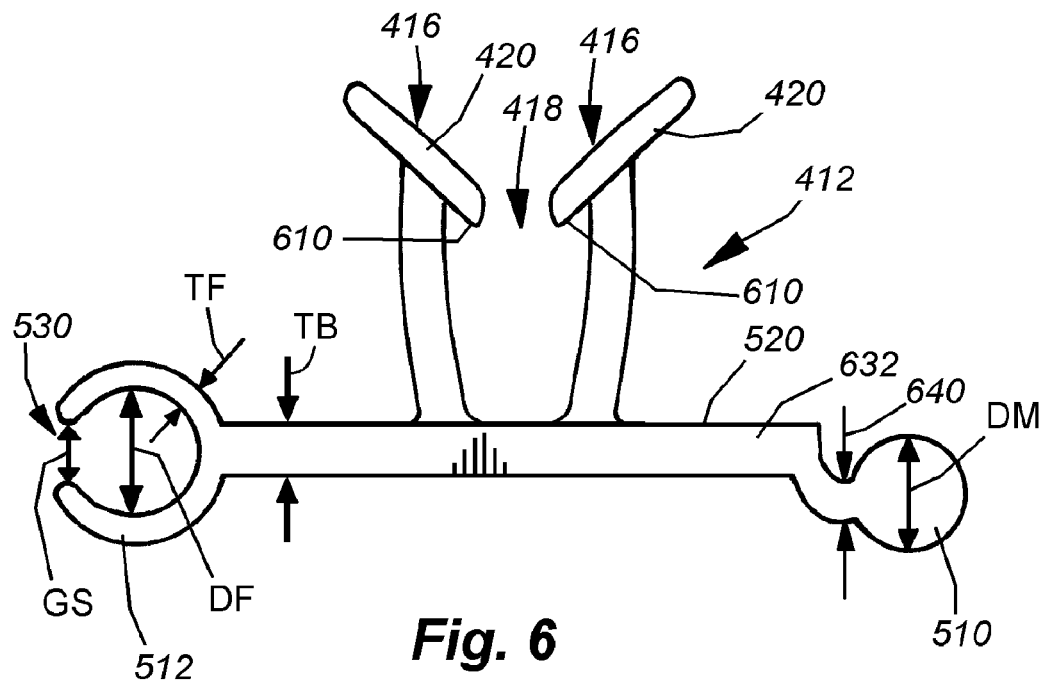
FIG. 6 is a side view of the clip of FIG. 5.

FIG. 4 shows a festooned grouping 400 of dual-ganged clips 410 according to an embodiment of this invention. This and other embodiments described with reference to FIGS. 1-18 embodiment detail a "higher-profile" clip, which can be readily substituted with the novel low-profile clip design described further below. With reference further to FIGS. 5 and 6, the clips 410 comprise a pair of opposed clip members 412 (also sometimes referred to herein as "clips"), joined by a central shaft segment 414. Each discrete clip 410 in the festooned grouping is a unitary structure, with the clip members 412 and adjoining intermediate segment 414 being molded together as a single unit. As will be described below alternate forming techniques, such as extrusion are also contemplated.

The clips 410 of this invention can be constructed from a variety of materials, which will also be described in further detail below. In general, the material should be durable, capable of withstanding reasonable levels of heat and pressure, and flexible so as to provide a good spring material. To this end, it is noted that each clip member 412 includes a pair of upright leg assemblies 416 extending from a generally planar, central base 520, which define therebetween a gap 418. This gap 418 allows insertion of the bead of a listing member (or other structure-to-be-secured) thereinto. In general, the legs are adapted to move elastically away from each other as a listing bead is passed through the gap.

Referring particularly to FIGS. 5 and 6, the leg assemblies 416 each include a respective inwardly slanted hook or barb 420 that together help to guide and/or funnel the listing into the gap 418. In addition, the barbs 420 each define an inner shoulder 610 (FIG. 6) that restricts outward movement of the listing, or other structural member, once it is forcibly inserted though the gap 418. The leg assemblies 416 are sized in thickness so that they exhibit a predetermined level of spring elasticity with respect to the central clip base 520. The size and shape of the clip base is highly variable. While not shown, the central clip base 520 can include a reinforcing rib, or other reinforcing structure, which extends below the flat upper portion 632 to help prevent flexure and/or breakage of the base 520 as the leg assemblies 416 are spread apart in certain embodiments. Any additional base reinforcement, as well as the general perimeter shape of the base 520 (shown here as a basic rectangle) are adapted to provide needed surface area for adhesion to the foam substrate as will be described further below. The particular structure of the base and leg assemblies are both highly variable and a variety of reinforcing ribs, flanges and other structures can be appended to each clip member as appropriate. The degree of reinforcement depends, in part, on the strength and durability of the materials employed to form the clip and the environment to which the clip is exposed during assembly and subsequent use.

Notably, extending from opposite ends of the base 520 (in a direction transverse to the elongation of the segment 414) is provided a pair of attachment members or "connectors" 510 and 512. In this embodiment, one attachment member 510 is an elongated cylindrical male connector and the opposing attachment member 512 is an open, semi-cylindrical female connector. The diameter DM of the male connector conforms relatively closely to the inner diameter DF of the female connector. In fact, DM can be slightly larger than DF in order to define a friction fit to maintain a given angular orientation between joined connectors 510, 512.

As shown particularly in FIG. 4, on adjacent clip members 412, each of the male connectors 510 is nested within a respective female connector 512 to define the depicted, festooned grouping of clips 400. The open gap 530 in each female connector includes the spacing distance GS (see FIG. 6) that is generally greater than the distance of the male connector base 640 (see FIG. 6), which extends between the central clip base 520 and the body of the mail connector 510. In this embodiment, the connector base 640 is a curved segment that positions the male connector slightly below the top plane of the central base 520. As will be described below, the female connector gap GS allows for limited rotational movement of male connectors when nested within female connectors. For the purposes of this embodiment, the male connector diameter DM is approximately three millimeters. The female connector inner diameter DF is approximately three millimeters with a slight reduction in relative size to provide the desired friction fit. The gap distance GS is approximately two millimeters, while the thickness TF of the female connector 512 is approximately one millimeter. The width WC (FIG. 5) of the male and female connectors is approximately eight millimeters. It is noted that these measurements are all exemplary and can be varied as appropriate depending upon the materials used and the application for the clip. In general, in the depicted applications, measurements such as width WC and diameter DM/DF can vary by several millimeters in alternate embodiments. The dimensions of the leg assemblies 416 are, likewise, highly variable. The leg assembly dimensions can be based upon the size and shape of the listing being engaged and other factors, such as the thickness of the foam substrate. The thickness TB of the base 520 is in a range of between approximately 1.5 to 2 millimeters in an exemplary embodiment. The thickness 640 of the male connector base is approximately one millimeter. This is sufficiently smaller than the gap distance DF for a female connector to allow the above-described rotational movement between clips, within a pre-determined range of arcuate, rotational movement.

Referring further to grouping 400 shown in FIG. 4, it is noted that each dual-ganged clip 410 is provided with alternating female and male connectors 512, 510 (respectively) on a given side of the clip. In other words, as depicted, the left hand clip member includes a male connector 510, while the right hand clip member includes a female connector 512. In the exemplary dual-ganged arrangement, this ensures that each clip is "ambidextrous" with respect to adjacent clips. In other words, each clip can be attached to adjacent clips in either of two orientations. This, of course, assumes that all clips are assembled with leg assemblies 416 facing the same (upward) direction. In alternate embodiments, male connectors can both be disposed on the same clip side and female connectors can both be placed on the opposite clip side. Such clips would not exhibit the above-described ambidextrous capability.

In the depicted embodiment, a central enlarged tab 560 is provided along the connecting segment 414. This tab is optional, and is, in part, a byproduct of the molding processors used to form the clip 410. However, this tab 560, as well as other structures on the clip 410, can be used to provide an identifying mark (such as the depicted "X"), which may indicate information manufacturing date, lot number and/or other desirable data. The enlarged tab 560 may also assist a worker in grasping the given clip for assembly into a foam structure. Similarly, the clip may provide a useful grasping point for removal of the clip from a clip-formation mold using manual or automated possesses.

In this embodiment, the base 520 of each clip also includes opposing throughout holes 570. These holes are optional, but can be sized and arranged so as to allow the clip segment to be driven by an appropriately sized and shaped tractor-pin-feed drive unit. Such a unit is particularly desirable where clips are fed in a continuous line, as will be described further below.

Figure 7:
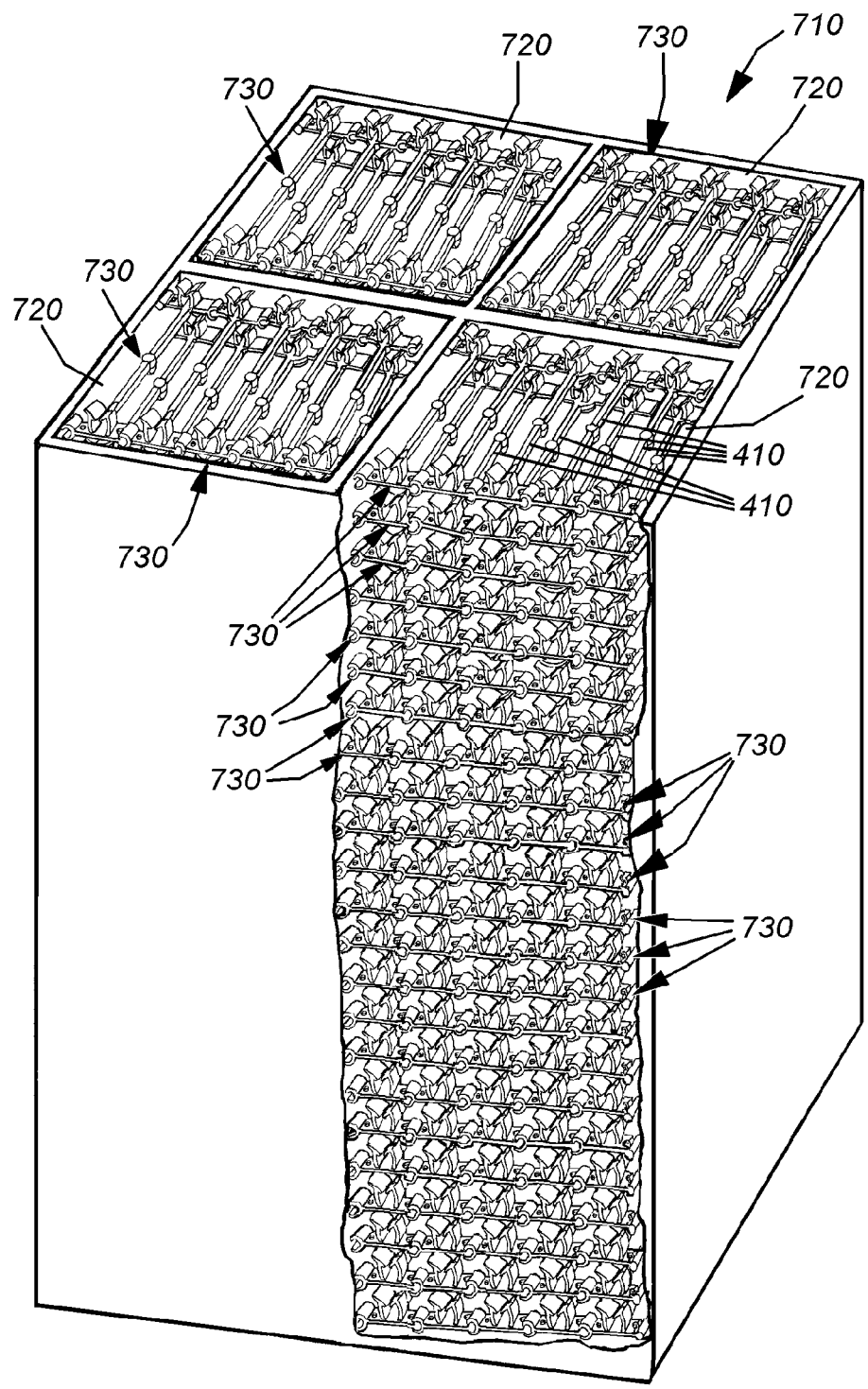
FIG. 7 is a partially cut-away perspective view of a storage and dispensing box for use with predetermined-size festooned groupings of dual-ganged clips according to an embodiment of the invention.

The number of clips grouped together, in accordance with the arrangement of FIG. 4, can be highly variable. In practice, an unlimited number of clips can be grouped together, thereby extending the group continuously along a line elongation (dashed line 450 in FIG. 4) define a festooned grouping of clips that suits a given end user's needs. One possible arrangement of grouped clips of clips is shown in FIG. 7. As depicted, a box or crate 710 has been provided with four separated compartments 720 and an open top. Within each compartment 720 is a stack of festooned groupings of clips 730. In this embodiment, each clip grouping 730 includes five interconnected, dual-ganged clips 410. The actual number of connected clips in a stacked grouping is highly variable in alternate embodiments. The exemplary group of five festooned clips generally provides for an easily manipulated size and shape for the average worker. By providing an integral, assembled group of clips, it stacks easily with respect to other groups without the risk of entanglement between groups. This is, in part, because each line of assembled clip members essentially establishes a continuous, flat strip that lies squarely on the tops of the leg assemblies of the underlying group. Hence, each grouping is supported by the combined expanse of leg assemblies in the underlying group. This prevents birds-nest-style entanglement that would result from a loosely packed supply of individual dual-ganged clips. The walls of each compartment are sized to restrict lateral (aligned with the connecting segments) and front-to-rear movement of each grouping. The flat bases of the clips remain squarely positioned over the leg assemblies of the underlying group in the stack.

In the exemplary storage embodiment of FIG. 7, there are twenty-three layers of clip groups divided into four compartments. A worker can easily lift each group out as a single unit as needed. With proper sizing, the box 710 can be arranged to define a cube with an approximate dimension of twelve inches by twelve inches by twelve inches in an exemplary embodiment. Boxes having other sizes, shapes and compartment arrangements are expressly contemplated in alternate embodiments.

In use, a worker or mechanical device removes a grouping of clips 730 from the top of a stack in one of the compartments 720. As needed each individual clip is then detached from the grouping by either (a) applying front-to rear tension to pull the clip away from the adjacent clip in the grouping pulling them apart (thereby spreading the female connector gap 530 and overcoming the spring force of each female connector, or (b) are sliding the clip laterally (in the direction of extension of the connecting segment (414)) relative to an adjacent clip in the grouping. Lateral sliding requires less force in most instances, but may require more dexterity than simply pulling clips apart. In either case the material of the clip member and the dimensions of male and female connectors are adapted to allow application of reasonable force without causing the clips to break. Once separated, clips can be assembled into a mold cavity by hand, or automated action, as described generally below.

Figure 8:
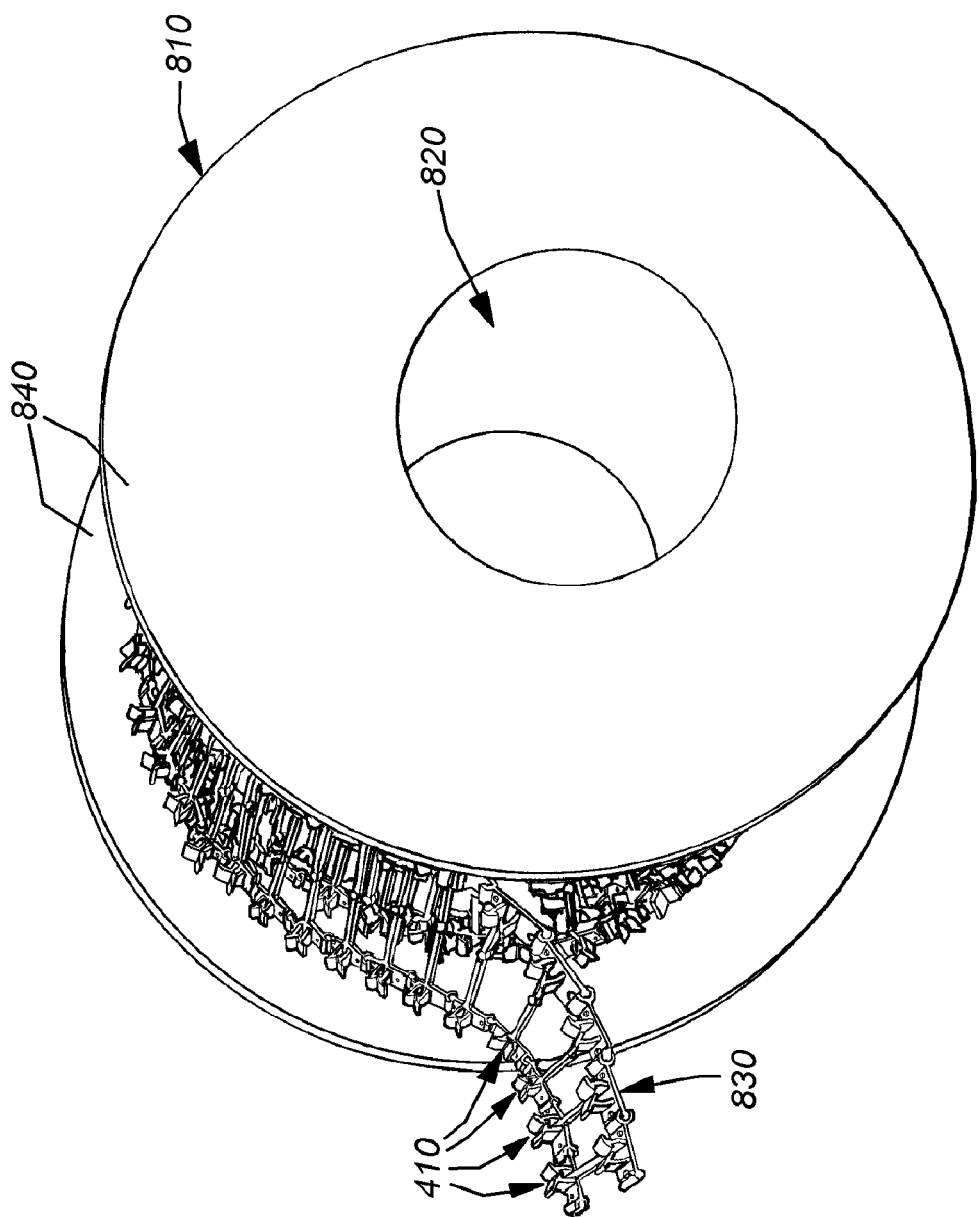
FIG. 8 is a perspective view of a storage and dispensing spool for use with continuous-run, festooned grouping of dual-ganged clips according to an embodiment of the invention.

Because the novel system for allowing grouping of clips of this embodiment provides for an unlimited length and a moderate degree of angular rotation between assembled groupings of clips, the system lends itself to the provision of a long, continuous length of clips on a reel or spool. An exemplary spooled arrangement of clips is shown in FIG. 8. The spool 810 includes and open central core 820 that supports a continuous length grouping 830 of clip s 410 in accordance with an embodiment of this invention. Because the bases of the clips form a continuous surface, they rest fully supported over the leg assemblies of underlying clips without falling through the underlying clips. To help prevent entanglement, this embodiment, the spool 810 includes two closely fitting side flanges 840 that restrict axial movement of clips so that each layer of grouped clips remain squarely located over the leg assemblies of the underlying clip layer.

Figure 9:
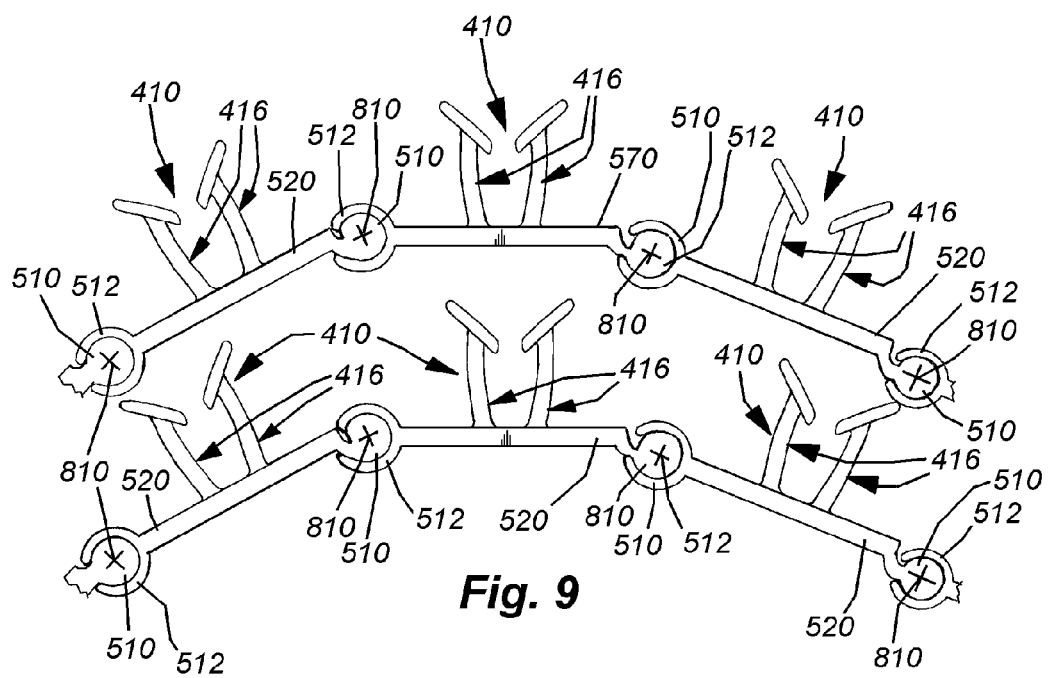
FIG. 9 is a partial side view of two layers of spooled clips in accordance with the embodiment of FIG. 8.

Also referring briefly to FIG. 9, the relationship between layers of stacked clips on a spool is shown in further detail. As depicted, each clip 410 is allowed to angularly deflect about a respective rotational axis 810 relative to an adjacent clip. The angular deflection (as defined by the relative orientation of the plane of each clip's base with respect to that of an adjacent clip's) of each clip with respect to an adjacent clip, in a spool arrangement, is determined by where the line of connected clips are with respect to the core 820. The minimum diameter of the spool core is generally restricted by the maximum bend angle between adjacent, connected clips. The bend angle can be varied, in part, by varying the diameter of the male and female connections 510 and 512 and increasing the width GS of the female connector gap spacing 530. However, angular deflection is essentially limited to a predetermined range that corresponds to a minimum core diameter in this embodiment.

Figure 10:
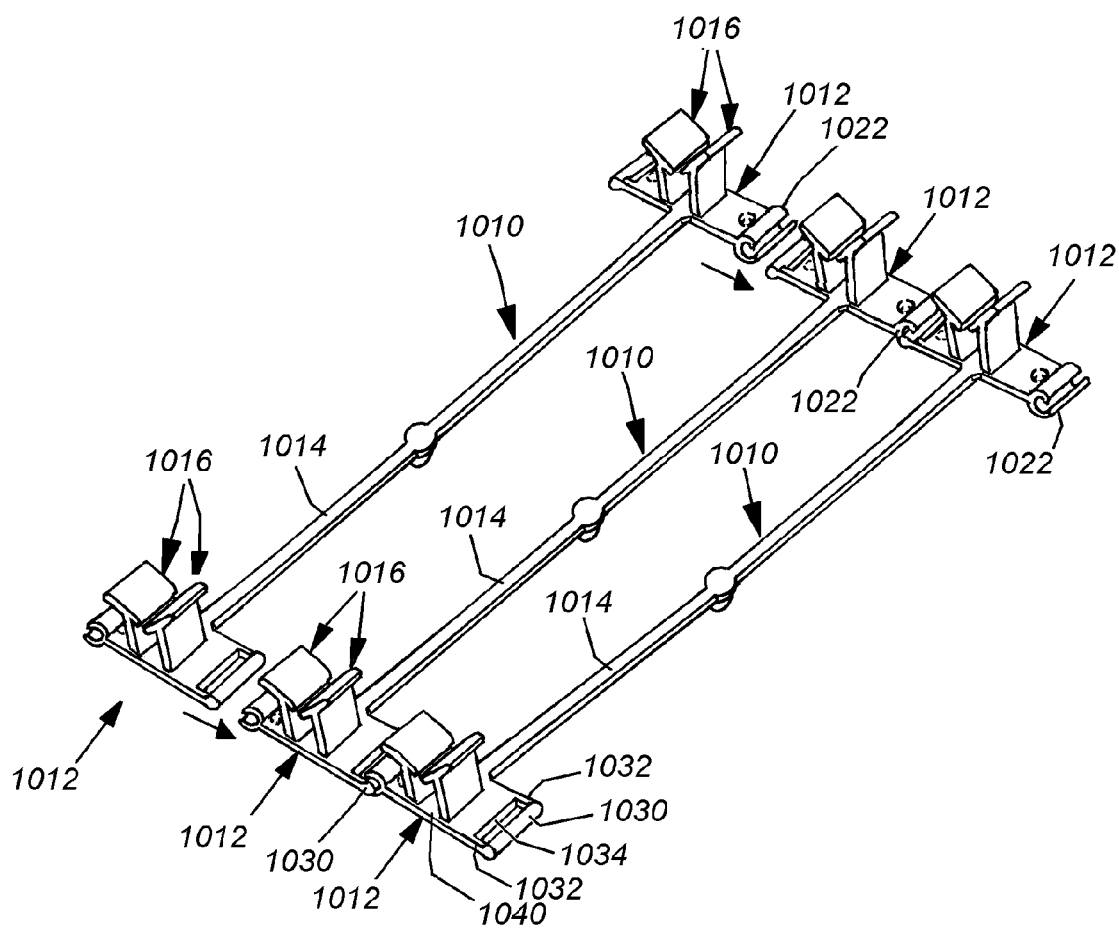
FIG. 10 is a perspective view of an exemplary festooned grouping of a plurality of dual-ganged clips, adapted for greater angular deflection between clips, according to an alternate embodiment of this invention.

An alternate embodiment for a clip 1010 is shown in FIG. 10. This clip 1010 also consists of a dual-ganged configuration with clip members 1012 on each of opposing ends of a narrowed, central joining segment 1014. This clip 1010 includes similarly constructed leg assemblies 1016 to those described above with respect to the clip 410 for engaging an appropriately dimensioned listing bead. The female connector 1022 of each clip is sized and arranged similarly to the female connector 512 described above. However, the male connector 1030 for each clip member 1012 is arranged on a pair of forwardly extending side braces 1032 that define an open central well or slot 1034 between the central base 1040 of the clip member 1012 and the cylindrical body of the male connector 1030. This well is sized and arranged so that, when a female connector 1022 is attached to a male connector 1030, the female connector rides within the slot 1034. In other words, the slot 1034 has a width in each of two orthogonal directions that is generally greater than the corresponding thickness and width of the female connector.

Figure 11:
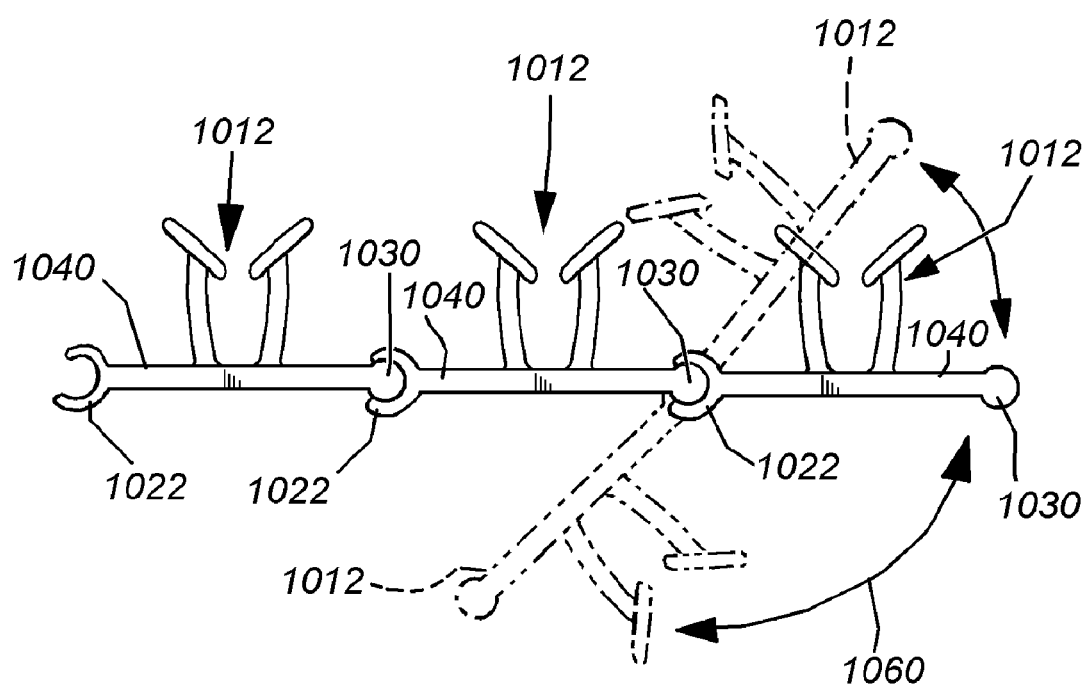
FIG. 11 is a side view of the festooned grouping of clips according to FIG. 10 illustrating an increased range of possible angular deflection.

As shown further in FIG. 11, the relative arrangement of the male connector 1030 and female connector 1035 allows each clip connected to move rotationally within a substantial range of angular deflection (shown in phantom) to allow the line of connected clips to be wrapped around a small-diameter core. In this example, the connected clips may actually bend to relative angles (defined by the plane on each clip's central base 1040) in excess of 90 degrees (see double-curved arrow 1060). This added range of inter-clip angular deflection may also be beneficial where clips are likely to be fed along a continuous line that contains various turns and bends. Also, this arrangement may be beneficial where lines of clips are subjected to significant bending during manual handling. Over-bending of clips with a low-degree of tolerable angular deflection may otherwise cause their ends to break.

Figure 12:
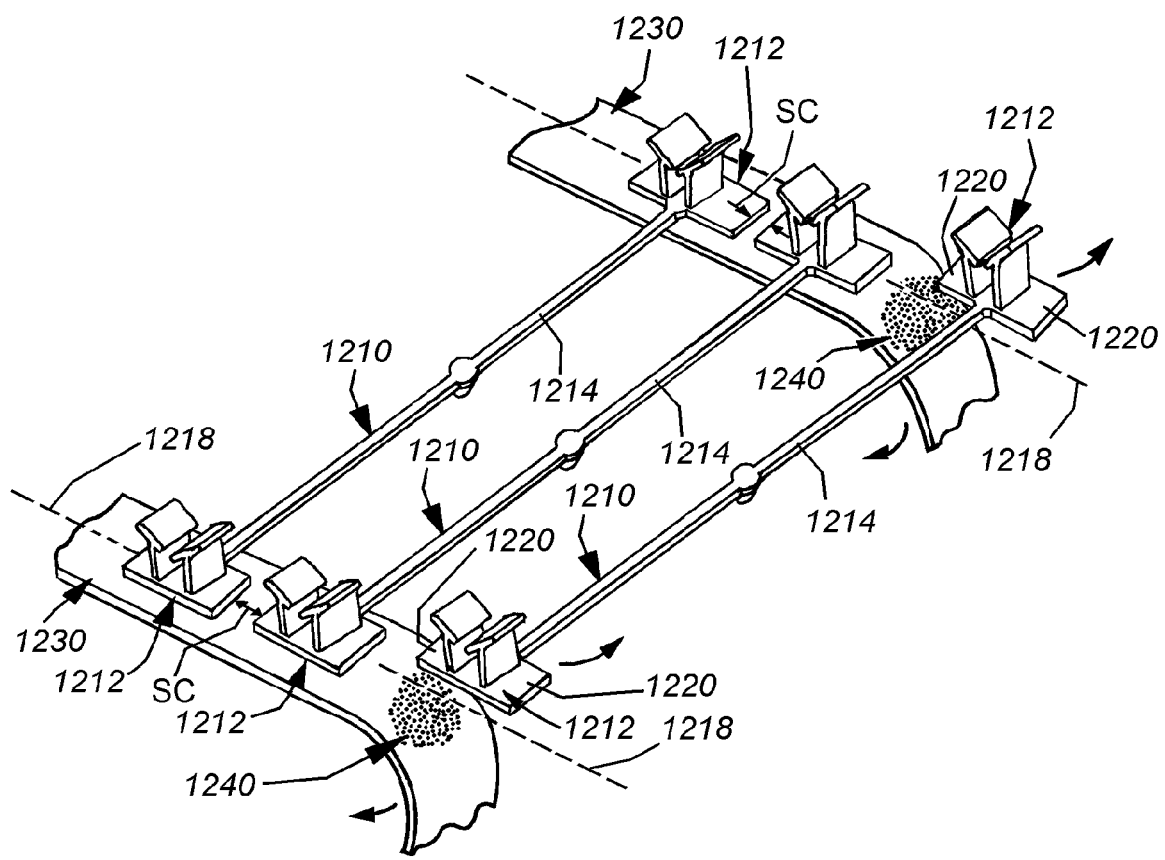
FIG. 12 is a perspective view of an exemplary festooned grouping of a plurality of dual-ganged clips, employing a pair of flexible strips to which ganged clips are removable attached, according to an alternate embodiment of this invention.

Another technique for providing a festooned grouping of clips is shown in FIG. 12. In this embodiment, the exemplary clips 1210 include two clip members 1212 joined by a unitary central segment 1214. In this embodiment each clip member also includes opposing ends 1220 (in the direction of feeding/grouping-dashed lines 1218) that are free of any clip-to-clip connectors, or other like structures. A continuous flexible strip or tape 1230 underlies each clip member 1212. The clip members 1212 are placed at a predetermined spacing SC along each strip 1230. Each strip 1230 can carry a continuous coating of adhesive, or a concentrated adhesive spot 1240 that specifically underlies the location of each attached clip member 1212. The adhesive can be any desirable industrial adhesive capable of removably securing the clip to the strip. Likewise, the strip 1230 can be constructed from paper, polymer sheet or any other synthetic/natural sheet material with the ability to flex and bend as shown. As clips 1214 are needed by a worker or automated device, they are torn from the strip, whereby the adhesive contact between the strip and each overlying clip member is broken. In alternate embodiments, one or more strips 1230 can be adhered to each clip between clip members, within the center region of the grouping, along, for example, the central segment 1214. In still further alternate embodiments, a pair of confronting strips may sandwich the segments 1214. In such an arrangement, clips can be removed by separating the two strips and withdrawing the clip therefrom in the manner of peeling a banana skin to withdraw the fruit.

While a tape or strip-base holding system has advantages in that it is highly flexible, it should be noted that this arrangement also provides an extra component that may add waste, and may become fouled in certain machinery. Thus, this embodiment may not be desirable in some instances.

Figure 13:
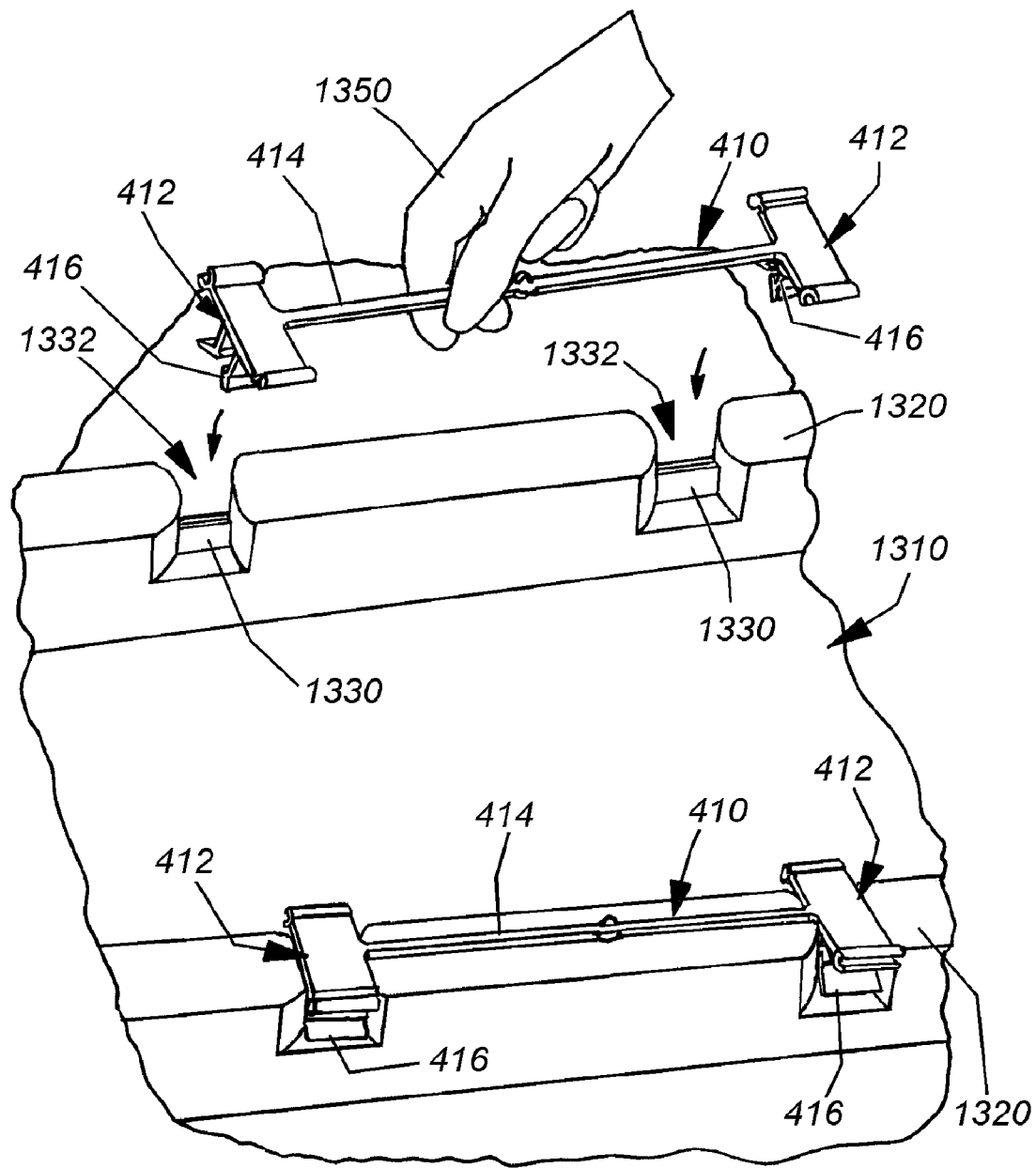
FIG. 13 is a partial perspective view detailing a typical application of dual-ganged clips to a mold cavity according to an embodiment of this invention.

With reference now to FIG. 13, a typical procedure for employing clips 410, once they are removed from a festooned group is shown. In this embodiment, a portion of an exemplary foam cushion mold cavity 1310 is depicted. This mold cavity includes rails 1320 upon which ganged clips 410 are mounted. In particular, each clip member's leg assemblies 416 are passed over narrowed webs 1330 formed within breaks 1332 in the rails 1320. As liquid foam is introduced to the mold cavity, the rails 1320 define trenches within the foam, such as those described above with reference to FIG. 3. The clips subsequently reside in the trenches with gaps between their legs exposed for insertion of listing. The rail webs 1330 provide accurate reference point for positioning clips during the molding process. They also prevent undesired movement of the clips while the foam is applied and cures.

As shown in FIG. 13, a worker's hand 1350 grasps a central segment 414 of the subject clip 410 and inserts it so that its leg assemblies 416 surround the web. The completed insertion is shown in the foreground of the illustration. When liquid foam is applied, it will surround and engage the clip members 412 and the central segment 414 so as to retain them with respect to the foam. As noted above, the particular materials employed to construct the clip 410 influence the effectiveness of the adhesion between the solidified foam and the embedded clip. In an alternate embodiment, it is contemplated that the process for insertion of single or ganged clips can be automated. One such automation technique is described with reference to rail clips. This process employs an end-effector that grasps and deposits clips onto a mold cavity. This process is described with reference to U.S. patent application Ser. No. 11/615,954 entitled CLIP FOR JOINING TUBULAR MEMBERS TO SUBSTRATES by Andrew W. Santin et al, the teachings of which are expressly incorporated herein by reference. It should be clear that a variety of robotic and/or electromechanically techniques can be employed to affect automation of clip placements. Such automation can employ a continuous feed of clips from for example, a spool as shown in FIG. 8.

The above-described embodiments show and define a dual-ganged clip. A dual-ganged clip has certain advantages in particular applications. It allows for ambidextrous interconnection, is not so elongated as to flop or flex excessively and is relatively easy to manipulate. However, it is expressly contemplated that the number of ganged clip members on a given groupable clip structure can be greater or less than the two joined clip members 412 shown and described above.

Figure 14:
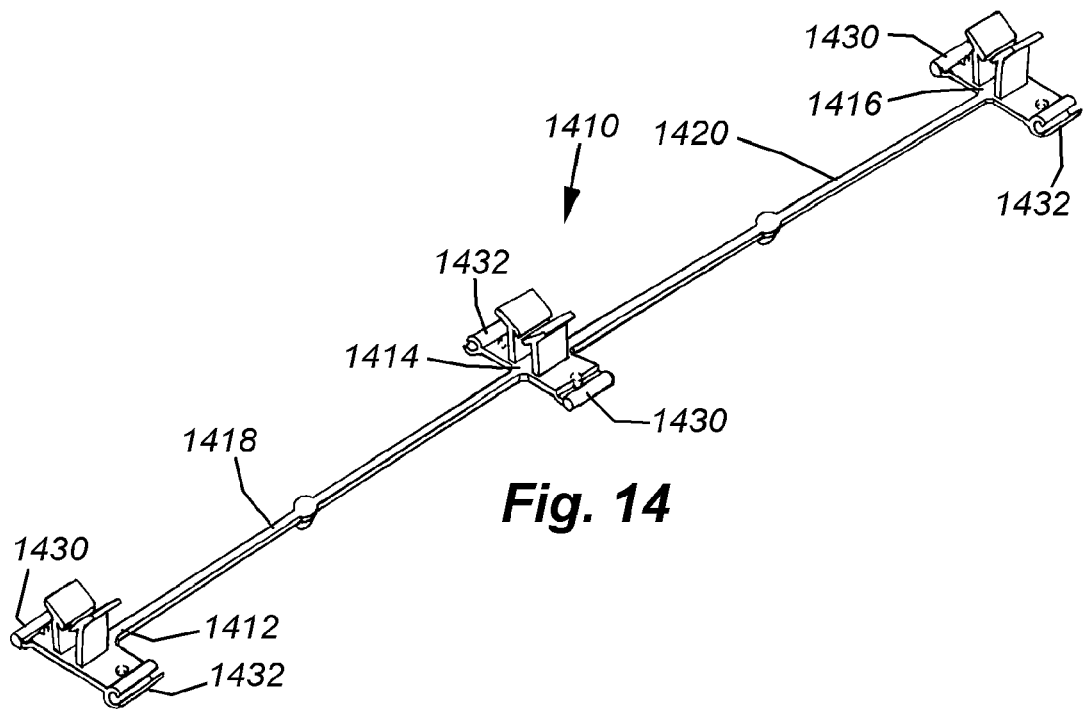
FIG. 14 is a perspective view of a triple-ganged clip adapted to be assembled into a festooned grouping of variable size according to an alternate embodiment of this invention.

Thus, FIG. 14 details a triple-ganged clip 1410. The three separated clip members 1412, 1414 and 1416 on this unitary clip 1410 are joined by intervening segments 1418 and 1420. Each clip member 1412, 1414 and 1416 includes an associated male connector 1430 and female connector 1432, which are generally similar in size and shape to the male connector 510 and female connector 512 described above. A three-ganged implementation lacks the ambidextrous capability of the above-described embodiments. However, such a three (or-more) ganged clip arrangement can be stored in a similarly festooned grouping (box or spool), and handled in a similar manner to those described above.

Figure 15:
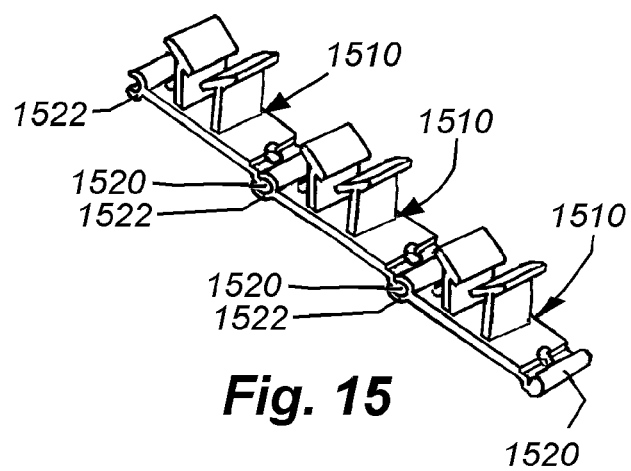
FIG. 15 is a perspective view of a festooned grouping of single clips in accordance with an alternate embodiment of this invention.

In another embodiment, a single clip member 1510 is shown in FIG. 15 as part of a festooned grouping of single clips. This grouping includes male connectors 1520 engaging adjacent female connectors 1522. These connectors define geometry similar to, or the same as that attached to the above-described clip members 412. Single-ganged and multi-ganged clips can all be provided on an appropriately sized spool to be dispensed as needed to a worker, or automated clip-placement device.

Figure 16:
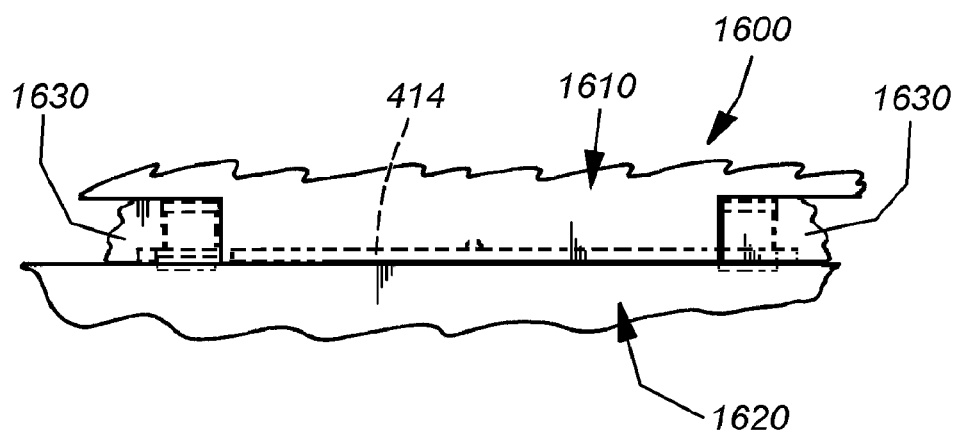
FIG. 16 is a somewhat schematic exposed side view of a mold assembly used to form multi-ganged festooned clips in accordance with an embodiment of this invention, shown in a closed orientation.
Figure 17:
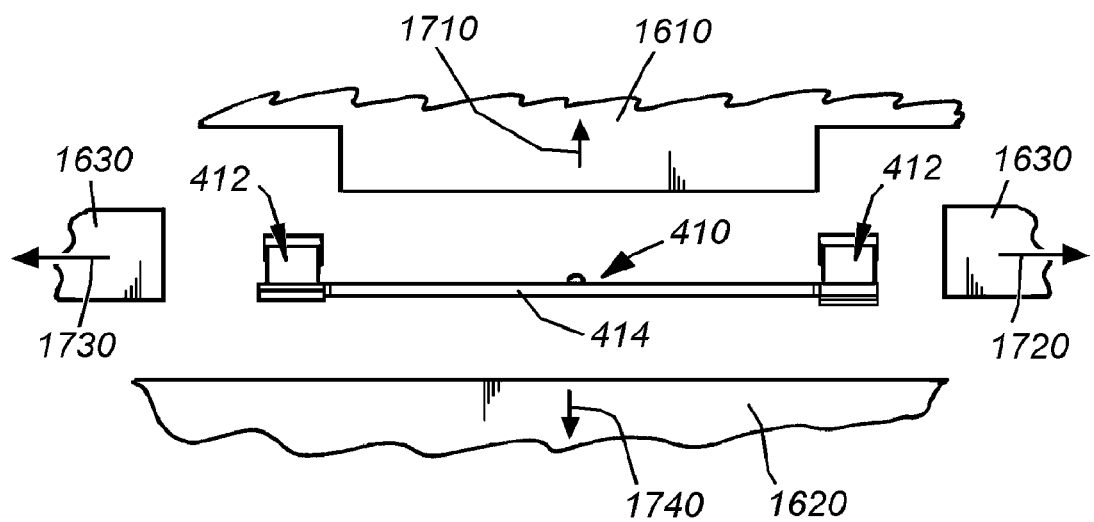
FIG. 17 is a somewhat schematic side view of the mold assembly of FIG. 16 shown opened so as to allow removal of an exemplary dual-ganged molded clip.

By employing appropriate manufacturing techniques, clips can be formed using extrusion, injection molding or other commercially available forming procedures. In a case of an extrusion, clips should be formed so that their features are relatively similar in an elongated direction. As the reader may surmise, such extrusion manufacturing procedures are readily employed for forming a single clip, such as that shown in FIG. 15. However, where the clip involves multiple-ganged clip members separated by narrow segments, extrusion may not provide the most effective forming technique. For such multi-ganged clips, an exemplary injection molding technique is, thus, detailed if FIGS. 16 and 17. As shown in FIG. 16, the liquefied material that, when solidified, forms the finished clip is injected into a mold cavity, which defines the clip outline (in phantom lines). This exemplary mold 1600 is defined by four engageble and disengageble pieces. A shown, the mold 1600 consists of a top section 1610 that generally defines the middle segment 414, a bottom section 1620, which forms the base of the clip, and two side sections 1630 that define the cavities for the corresponding clip member base and legs.

Once the liquid clip material has solidified within the mold 1600, the mold sections 1610, 1620 and 1630 are withdrawn as shown in FIG. 16 according to a defined order. In particular, the bottom section 1610 can be withdrawn first (arrow 1730). This is followed by withdrawal of the side sections 1630 (arrow 1720), and finally by withdrawal of the top section 1620 (arrow 1710). A completed clip 410 is, thus, reviled and ready for assembly into a festooned grouping. A variety of alternate mold geometries can be employed in alternate embodiments.

Note that it is contemplated that available part-forming techniques can be employed to mold (or otherwise form) a plurality of clips together in a festooned grouping that with the constituent clips already removably connected together. In other words an entire festooned grouping is molded together. In such a procedure, a thin liquid-impermeable boundary is established between male and female connectors as they are molded. When the side pieces of such a mold are removed, the previously separated male and female connectors are brought into contact with each other. At this time they are separate components and capable of rotating with respect to each other.

As described above, it is desirable to construct a clip in accordance with this invention using materials that exhibit durability, heat-resistance, and the ability to chemically bond with ordinary foams as used in commercially available seat cushions. Durability and heat resistance are particularly desirable as it is common for the temperature of foam to rise substantially during the molding process, which may melt and/or thermally deform clips constructed from certain materials. Clips may also be prone to breakage and deformation due to the application of roll crushers (which may be heated) to the foam cushion to aid in its formation. These rollers may undesirable crush clips that are constructed from weaker/less-durable materials.

Figure 18:
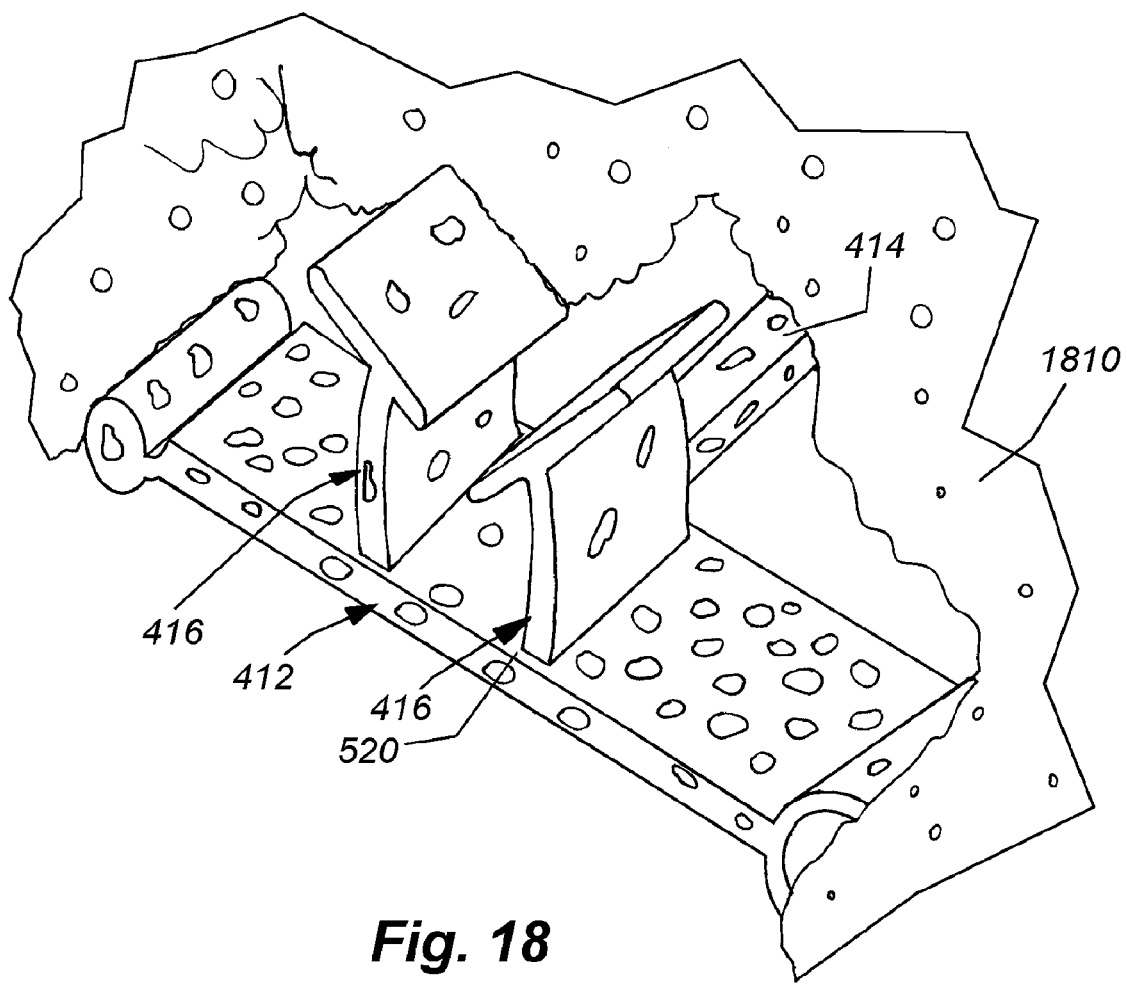
FIG. 18 is a partially exposed perspective view of an exemplary clip constructed from a material in accordance with an embodiment of this invention that exhibits chemical adhesion in contact with commercially available foam substances.

With reference to FIG. 18, surface bonding of the clip member 412 relative to the overlying foam 1810 is illustrated. In a typical implementation, the foam has been removed from the region surrounding the clip to show a surface that has been etched due to the action of chemical bonding with the foam while it is in liquid form, as shown by the depicted roughened surface on the clip member 412 and adjoining segment 414. The surface of a clip member can be relatively smooth, or can be provided with a variety of different types of surface textures and/or structures that increase bondable surface area.

It is contemplated that foams can typically comprise polyurethane compositions that are based upon methylene-diphenyl-diisocyanate (MDI) and toluene-diisocyanate (TDI), respectively representing the commercial application of so-called cold cure and hot cure foam technologies. Each of these types of foams have been shown to react chemically with certain types of hard polymers (plastics) during curing from a liquid to a solid state. A variety of materials possess these characteristics, and can be used to form clips. Some examples include, but are not limited to, nylon, polybutylene terephthalate (PBT), and polycarbonate (PC) compounds. In particular, polycarbonate can be transparent, allowing defects to be detected, has excellent molding characteristics, allowing small features to be defined in parts and has superior heat-resistance, which better survives the exothermic effects of certain foams (in which temperatures can exceed 130 C), without melting or deforming under the pressure of a roll crusher. Polycarbonate is also quite durable and long-lived under cyclic loading.

II. Low-Profile Clip

Figure 19:
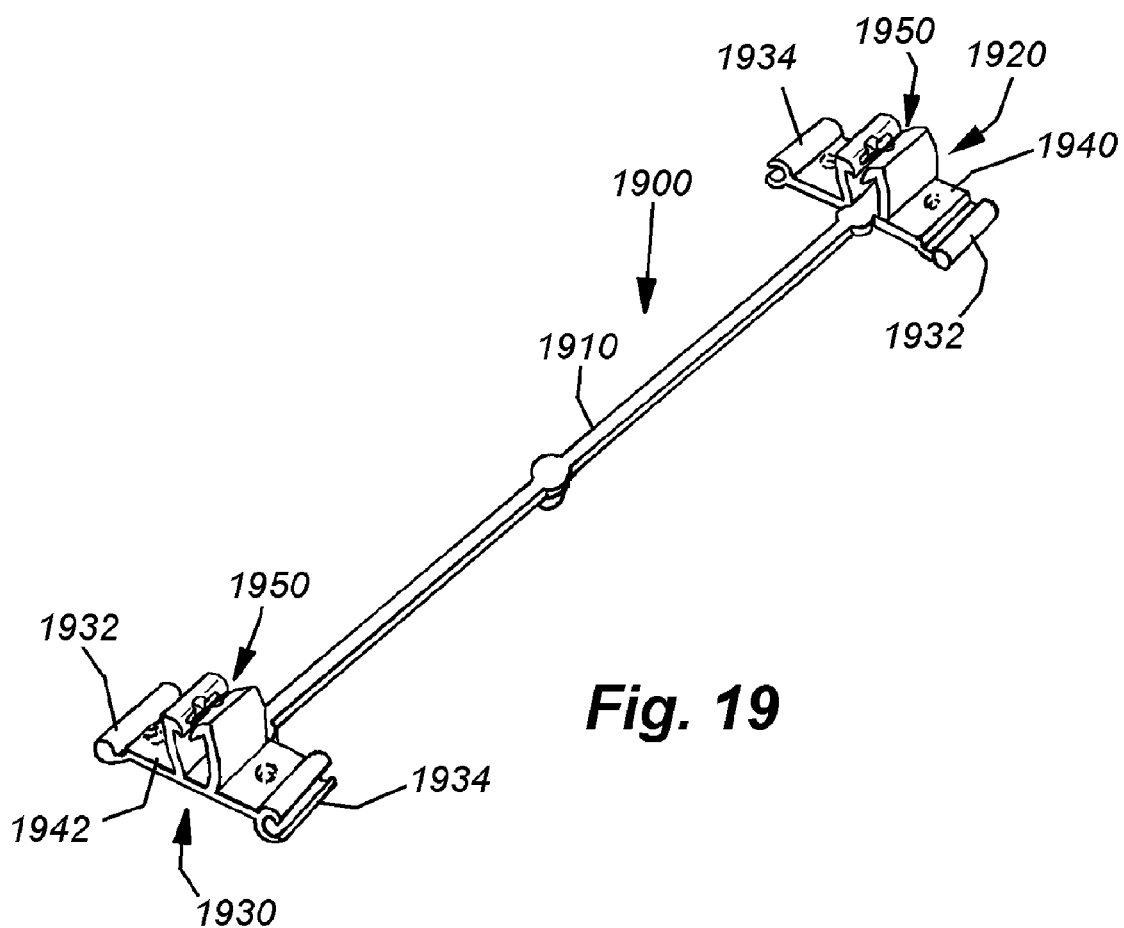
FIG. 19 is a perspective view of a single dual-ganged clip from the festooned grouping in accordance with the teachings of this invention, and having a low-profile clip geometry according to an illustrative embodiment.
Figure 20:
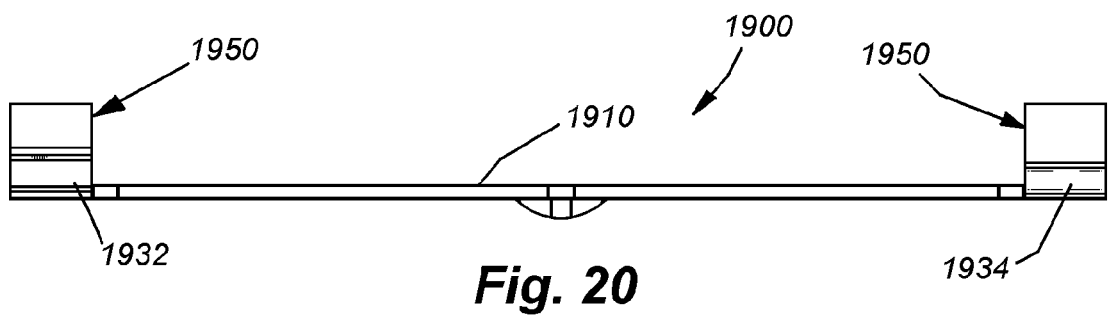
FIG. 20 is a side view of the illustrative low-profile single dual-ganged clip according to FIG. 19.

FIGS. 19 and 20 show a festooned arrangement 1900 for a "low-profile" upholstery clip according to an illustrative embodiment of this invention. The depicted festooning arrangement is similar to the implementations described above. It is contemplated that any of the above-described festooning arrangements can be employed in alternate embodiments. In this embodiment, a middle segment 1910 joins two opposing clips (each opposing end structure of the middle segment being collectively termed a "clip" herein) 1920 and 1930. Each clip 1920, 1930 includes a male and female festooning connector 1932 and 1934, respectively, formed on each of opposing ends of a clip base 1940 and 1942, respectively. A respective clip member 1950 extends upwardly from each base 1942. In general, the clip base 1940, 1942, and its respective male and female connectors (1932 and 1934) can be formed similarly to the above-described embodiments. The clip members 1950 are, however, constructed according to a novel, low-profile design that avoids certain disadvantages which may apply to higher-profile clips of the prior art.

Figure 21:
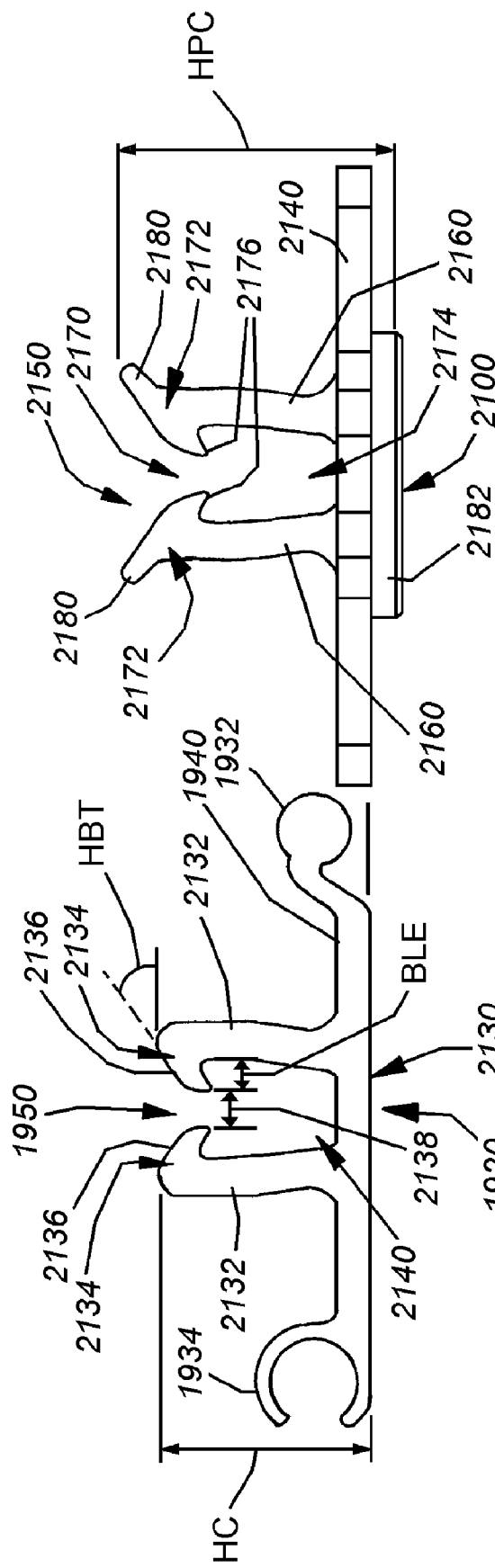
FIG. 21 is a side view comparing the illustrative low-profile clip of FIG. 19 with an exemplary prior art, higher-profile clip geometry.

Reference is now made to FIG. 21, which shows a generalized comparison between the low-profile clip 1920 of this embodiment and a prior are clip 2100 of generally good design. The exemplary low-profile clip 1920 and a prior art clip 2100 of similar function are each shown side-by-side in the figure. The base 1940 of the prior art clip includes the above-described male and female festooning connectors 1932 and 1934. However, for the purposes of this description, those connectors can be disregarded as the discussion relates mainly to the dimensions of the clip member 1950. The prior art clip 2100 includes a non-festooned base 2140 and an associated clip member 2150. This prior are clip member 2150 comprises are pair of legs 2160 that extend upwardly from the base 2140. It is constructed from an acceptable polymer that resists heat and temperature variations. A narrow gap 2170 is defined between a pair of involute, ramped barbs 2172. The barbs 2172 are sized and arranged to receive, guide and capture a listing bead within the central region 2174 between the legs 2160 when the listing bead is received into the central region 2174, between the legs 2160 and below the barbs 2172.

While the illustrative embodiment in shown in connection with a listing bead, joined to a fabric covering, the clip of this embodiment can be joined to other elements of the seat, such as a rail or wire that comprises part of the spring structure of the seat below the foam cushion. Because the lower side of the cushion in modern vehicles is becoming increasingly occupied by sensors, heating elements and other electronic and/or mechanical components, the ability to provide a lower-profile clip to the underside of the cushion can be highly desirable Thus, as described herein, the term "bead", shall refer to any element having a cross-sectional profile than can be effectively captured by the clip of this invention (both higher-profile and lower profile) on any location of the seat (all of these seat elements being termed collectively herein as "upholstery"). Likewise, a "bead" can be a component with a cross-sectional profile that is shaped to "marry" specifically to the clip of this invention, or can be a more-generalized cross sectional shape, such as a circle, oval or regular/irregular polygon. Moreover, the "beads" can be constructed from polymer, metal, composites, or a combination of the same.

When the bead is received into the region 2174, it is thereby captured by the bottom faces of the lower, inwardly directed hook portions 2176 of the barbs 2172. The barbs 2172 include upward extensions or wings 2180 that form a widened funnel to assist a manual worker (or insertion device) in guiding the listing bead into the gap 2170. The overall height HPT of the prior art clip, including a downwardly directed reinforcing bottom plate 2182, is approximately 13.18 millimeters. As described above, this clip geometry is highly effective at securing listing, but its overall height may cause its top (including barbs 2172) to protrude into the upholstery covering, particularly when the foam substrate containing the prior art clip 2100 is compressed by a seated individual. Hence, it is highly desirable to provide a lower-profile clip, such as the clip 1920 shown adjacent to the prior art clip 2100.

The illustrative clip 1920 is constructed with a generally linear and planar base 2130. A pair of clip legs 2132 extend upwardly from the base 2130 to a pair of barbs 2134. These barbs omit outward and/or upward end extensions/wings, such as the prior art projections 2180. Their tops 2136 are angled at an angle HBT of between approximately 25 and 35 degrees with an illustrative value of 32.84 degrees. The barbs 2134 taper toward, and terminate at, opposed, rounded-over ends at a gap 2138 that opens into a central region 2140, adapted to receive and secure a listing bead having a geometry to be described further below. The gap 2138 has a width of between approximately 1.2 and 3.0 millimeters with an illustrative value of 1.80 millimeters. The sides of the barbs across the gap are approximately perpendicular with respect to the base. The exemplary radii of respective roundovers and fillets will be described further with respect to FIG. 23 below. Adjacent to the gap 2138, the central region between the legs opens to a widened width of between approximately 4.5 and 5.5 millimeters and an illustrative value of 4.68 millimeters. Likewise, each barb has an inward length of extension LBE of approximately 1.2 to 1.5 millimeters with an illustrative value of 1.44 millimeters. This extension length is sufficient to provide the desired pull-out-to-push-in force ratio of 8:1.

Note that any angles taken with reference to the base are considered to be taken with reference to a horizontal plane generally passing through the base in a direction of extension of the base. In this embodiment the top base surface of the clip is essentially flat, so the horizontal reference plane is actually coplanar with the base top. Where the base has irregular surfaces in alternate embodiment, an arbitrary horizontal plane that passes through the roots of the clip legs, where they extend from the base can be used as the reference plane for clip member measurements as provided herein. Hence the base need not be, itself, planar in alternate embodiments.

Figure 22:
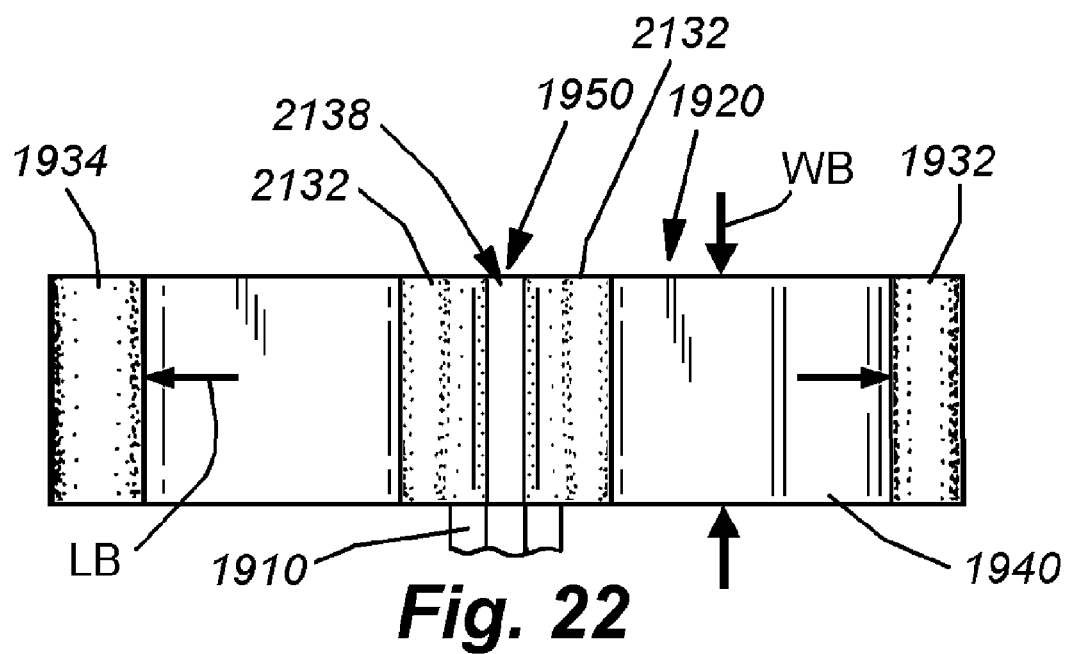
FIG. 22 is a top view of the illustrative low profile clip of FIG. 19.
Figure 23:
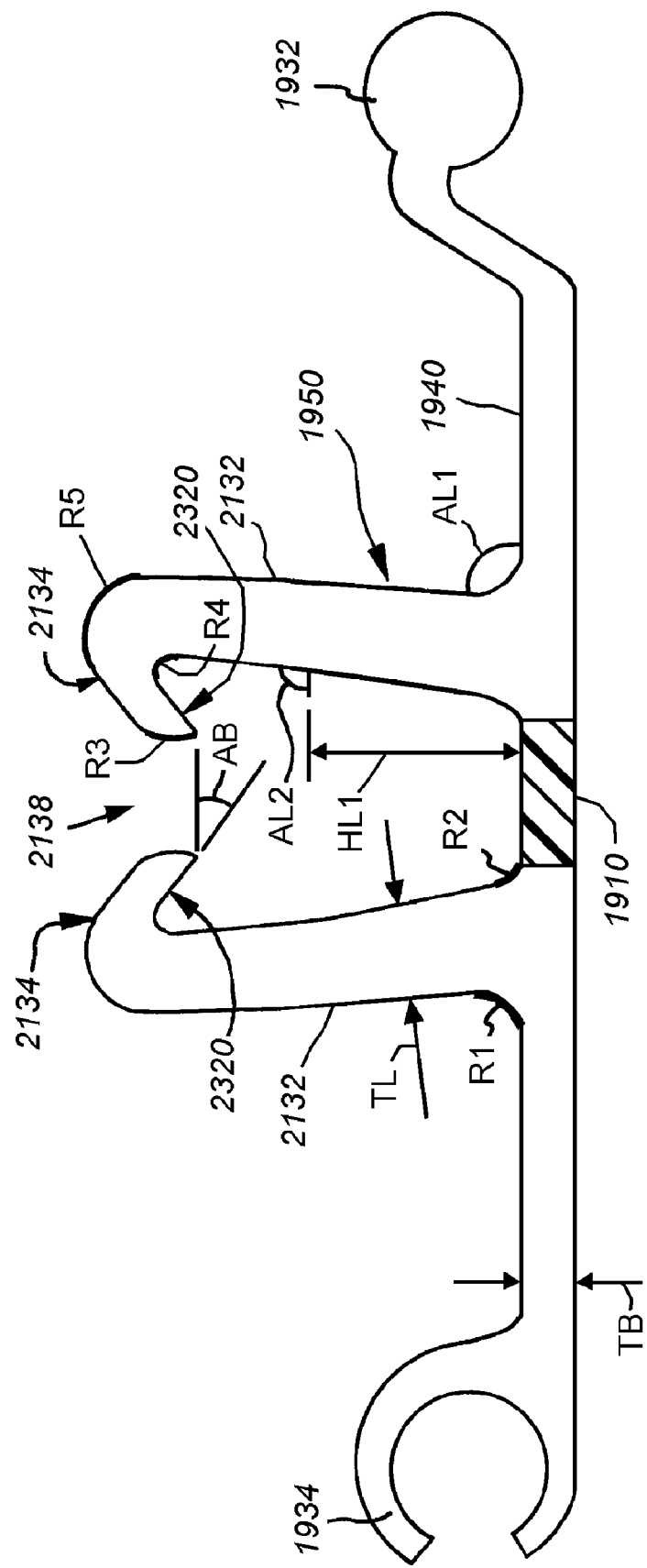
FIG. 23 is a side view of the illustrative low-profile clip of FIG. 19.

Referring further to FIGS. 22 and 23, the legs 2132 define an approximate leg thickness TL in a range of approximately 1.0 to 2.0 millimeters along their length with an illustrative value of 1.78 millimeters. In an illustrative embodiment, the legs exhibit a substantially uniform thickness TL along all or substantially all their entire lengths (above the root radiuses or fillets (R1, R2)). This uniform thickness helps to better distribute bending loads and tension because the deflection along each leg is somewhat constant, thereby avoiding breakage during clip installation, bead installation and from pullout tension during field use. In the illustrative embodiment, the legs 2132 extend from the base at a first angle AL1 that is in a range of between approximately 80 and 85 degrees with an illustrative value of 82.17 degrees. At an elevation HL1 of approximately 4.0 to 4.3 millimeters above the base 2130 (illustratively being 4.29 millimeters), the legs 2132 thereafter extend to their respective barbed tops at an angle AL2, which is closer to the perpendicular and measures approximately 88 to 90 degrees (90 in the illustrative embodiment). Each lower leg segment defines either a constant thickness (TL) along its length to its respective root at the base. Alternative the lower leg segments can define a slight outward taper toward the base for increased strength. Likewise, the roots of the legs define a slight fillet or radius with respect to the base to avoid stress concentrations inherent with sharp corners. In this embodiment, the outer base fillet R1 has a radius of approximately 1.48 millimeters, the radius R2 of the inner base fillet has a radius R2 of approximately 0.76 millimeter. As noted above, the top surfaces of the barbs 2134 are rounded over as shown in FIG. 21 to aid in guiding the bead into the gap 2138, but are also free of extended upwardly and/or outwardly directed wings. The inner top round-over has a radius R3 of approximately 1.02 millimeter. The inside radius (within the central region) R4 is approximately 0.38 millimeter. This affords a sufficient flattened engagement surface at the bottom of each barb wile avoiding stress concentrations in this critical region. The outer top radius for each barb R5 is approximately 1.08 millimeter. The resulting overall height HC of the illustrative clip 1920 from the base bottom to barb tops is approximately 10.0 millimeters or less. Hence, a clip with similar or better performance to the prior art clip 2100, and other similar art clips is achieved based upon the above-described geometry.

While the illustrative clip legs generally exhibit upper and lower segments that are each substantially linear and directed at differing angles, it is expressly contemplated that the legs can define a somewhat continuous curve, or that a larger number (than two) of linear segments can comprise each leg. As such the angles AL1 and AL2 are defined for the average or median angle of the curved or segmented sections of the leg that fall generally within the lower segment's elevation and upper segment's elevation, respectively.

In order to provide desired clip performance, the materials used to construct the clip are chosen for their ability to satisfy a variety of design requirements. In an illustrative embodiment, the material is selected so that it provides good resistance to wide temperature variations; avoids permanent heat deformation in temperatures exceeding 130° C.; exhibits high stress with minimum strain; provides sufficient ductility and memory to deflect and rebound, both after listing is attached, and when other forces are applied; exhibits sufficient material strength to withstand pullout of listing; is generally resistant to heat history, so that the high temperatures of processing do not weaken it; and promotes chemical reactivity in association with isocyanate, or similar foam, to produce desired bonding effects between the clip base and the foam. To meet each of these performance benchmarks, the clip is typically constructed from a blended polycarbonate material which beneficially allows a reduced wall thickness (thickness TL) and the removal of reinforcing ribs that are common in other prior art clips. This blended polycarbonate more particularly allows for the desired low-profile height of 10.0 millimeters, or lower. Since listing is often a commercially predetermined shape, the clips central region/interior space between the base and barbs must be roomy enough to allow the listing to fully push through the gap, as described below, and become secured against the bottom faces 2320 of the barbs 2134. Hence, in this embodiment, as described below, the flattened barb bottom faces 2320 are oriented at a specific angle AB between approximately 20 to 35 degrees with an illustrative value of 29 degrees, which approximately matches the angle (see angle AW in FIG. 25) of the top, barb-engaging walls of the listing bead. In general, the depicted design allows for an 8:1 pullout-to-push-in ratio. Thus, eight times more strength is needed to pull the listing out of a clip than to push it in, thereby rendering the performance of the illustrative design highly effective.

In this embodiment a commercially available blended polycarbonate is employed. Polycarbonate (PC) has shown to exhibit high toughness with high heat deflection generally. When blended with an "impact modifier," such as PBT (Polyester) or ABS (Acrylonitrile Butadiene Styrene), this combination increases the ductility and improves chemical resistance while still maintaining the desired bonding effect with foam. As such, addition of an impact modifier to the base material (PC in this embodiment) reduces the risk of impact-induced breakage and/or permanent, plastic deformation of clip legs or the base during installation or bead push-in. Some illustrative ratios of PC blend that can be employed according to this invention include: 75% PC with 25% PBT; 95% PC with 5% PBT; and 85% PC 15% ABS. The exact blend of compounds used and the proportions employed is highly variable, and other formulations that achieve the desired set of performance characteristics for the clip can be employed in alternate embodiments.

In selecting such a blended polycarbonate, it has been determined through empirical data and testing that a number of other materials did not provide desired characteristics for the illustrative low-profile design. For example, polyoxymethylene (POM) plastic (used in a number of commercially available clips) exhibits poor bonding to foam, is brittle when impacted, and shows poor cold break performance. Similarly, polypropene exhibits poor cold break performance, low heat deflection temperature, poor bonding to foam, and poor elongation. ABS plastic taken alone also exhibits a low heat deflection temperature and poor strain under load. Polybutylene terephthalate (TBT) plastic similarly exhibits a low heat deflection temperature and shows poor heat history performance after processing. Nylon, while a slightly more promising material, exhibits a lower bonding to foam, is brittle under impact and also tends to exhibit variations in its performance characteristics due to its hydroscopic properties.

During testing the inventive low-profile clip of this invention exhibited the following characteristics:

| | |
|---|---|
| Average Push-in Force | 58 N |
| Average Pull-out Force | 480 N |
| At 80° C., Average Pull-out Force | 460 N |

No breakage from a 120-degree Wedge drop into clip gap for 30 samples (all test samples remained unbroken)

A further comparative performance analysis of the clip of the illustrative embodiment versus a leading conventional upholstery clip of greater height (produced by OKE of Germany) is shown in the following chart (at near-room temperature):

| Test Procedure | Illustrative Embodiment | Competitor |
| --- | --- | --- |
| Height | 10 mm | 13.8 mm |
| Material | PC Blend | POM |
| Push-in Force | 49 N | 49 N |
| Pull-out Force | 461 N with no breaks | 242 N with 56% Breakage |
| Cold Break | No Breaks | 100% |
| Drop Test | | Breakage |

It should be clear that the illustrative lower-profile clip exhibits superior performance to a commonly used higher-profile clip for similar applications.

While the clip material herein is selected, in part, for its chemical adhesion properties in curing foam, in alternate embodiments, the clip may not be embedded in the foam, but applied to the foam surface (or another type of substrate) using adhesives, tapes or other fasteners (such as rivets or hook-and-loop fastener material). Hence, the material may be modifies to display reduced chemical adhesion in such instances and non-embedded application of clips is otherwise expressly contemplated herein.

Figure 24:
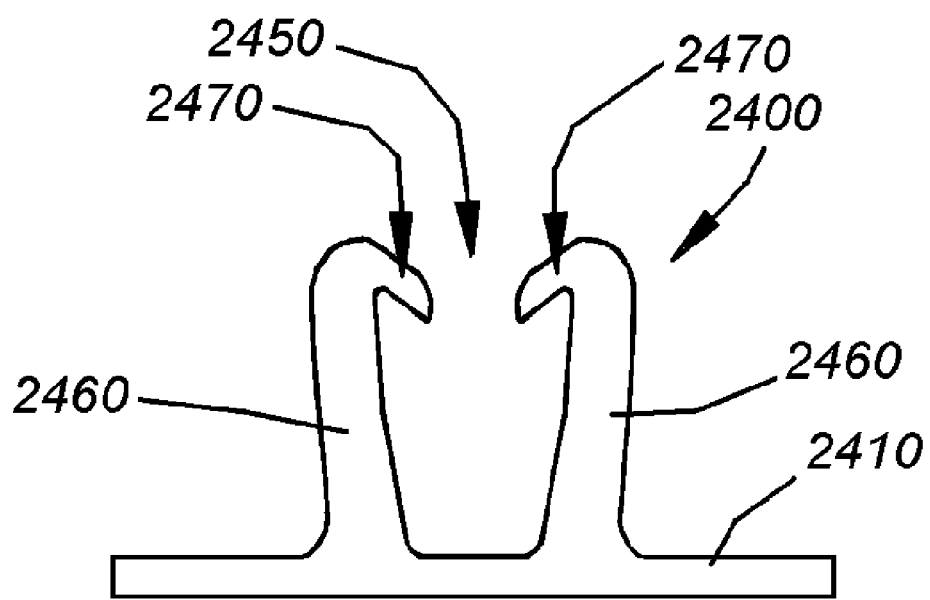
FIG. 24 is a side view of an illustrative single, low-profile clip according to an embodiment of this invention.

With brief reference FIG. 24, an embodiment of a clip 2400 is depicted in which the clip is either a non-festooned, multiple-clip assembly, or a stand-alone, single clip member with no other attached clips. This clip includes a planar (flat) rectangular base 2410 and an upwardly directed clip member 2450 with associated legs 2460 and shortened barbs 2470 that generally define the cross-sectional geometry of the clip 1920 described above. The base 2410, (as well as the above-described base 1940) can have a width WB (FIG. 22) of approximately 6 to 9 millimeters with an illustrative value of 7.8 millimeters. The base width is widely variable in alternate embodiments and a wide variation of widths is expressly contemplated beyond the above-specified, exemplary width values. The clip legs have a similar width in this embodiment, but can be narrower than the base width WB in alternate embodiments. In general, the base should be wide enough so as to support clip member legs of a desired size. This maintains the strength of the clip member legs. Legs that are too narrow will be more likely to break or fracture during installation of listing or in subsequent field use. By varying the width WB of (at least) the legs, the performance characteristics of the clip can be varied to accommodate different ranges of push-in and pull-out force, as well as overall load-handling capability. By experimental data, the appropriate width WB of the legs (and optionally the base) can be determined for a given application.

Note that the length of the clip base (LB FIG. 22), between festooning connectors or non-connector ends is highly variable, but is approximately 12-18 millimeters in this embodiment. The thickness TB (FIG. 23) of the base is also highly variable, but is between approximately 1.0 and 2.0 millimeters with an illustrative value of 1.52 millimeters in this embodiment. In general, any clip base herein should have sufficient area to allow it to appropriately adhere to, and become permanently anchored within, the foam substrate.

Note that the base thickness TB can be sized to approximately match (or be greater than) the thickness TL of the legs. Combined with appropriate stress-relieving fillets at the leg roots (interconnections with the base), the overall, substantially uniform thickness of the clip's clamping region (i.e. the legs and intervening base segment) effectively distributes the load from bead-installation flexure and pull-out tension uniformly over the entire clip member structure. This helps to better avoid clip breakage during clip and bead installation and subsequent field use of the installed clip. This is essentially a C-clamp-effect.

Figure 25:
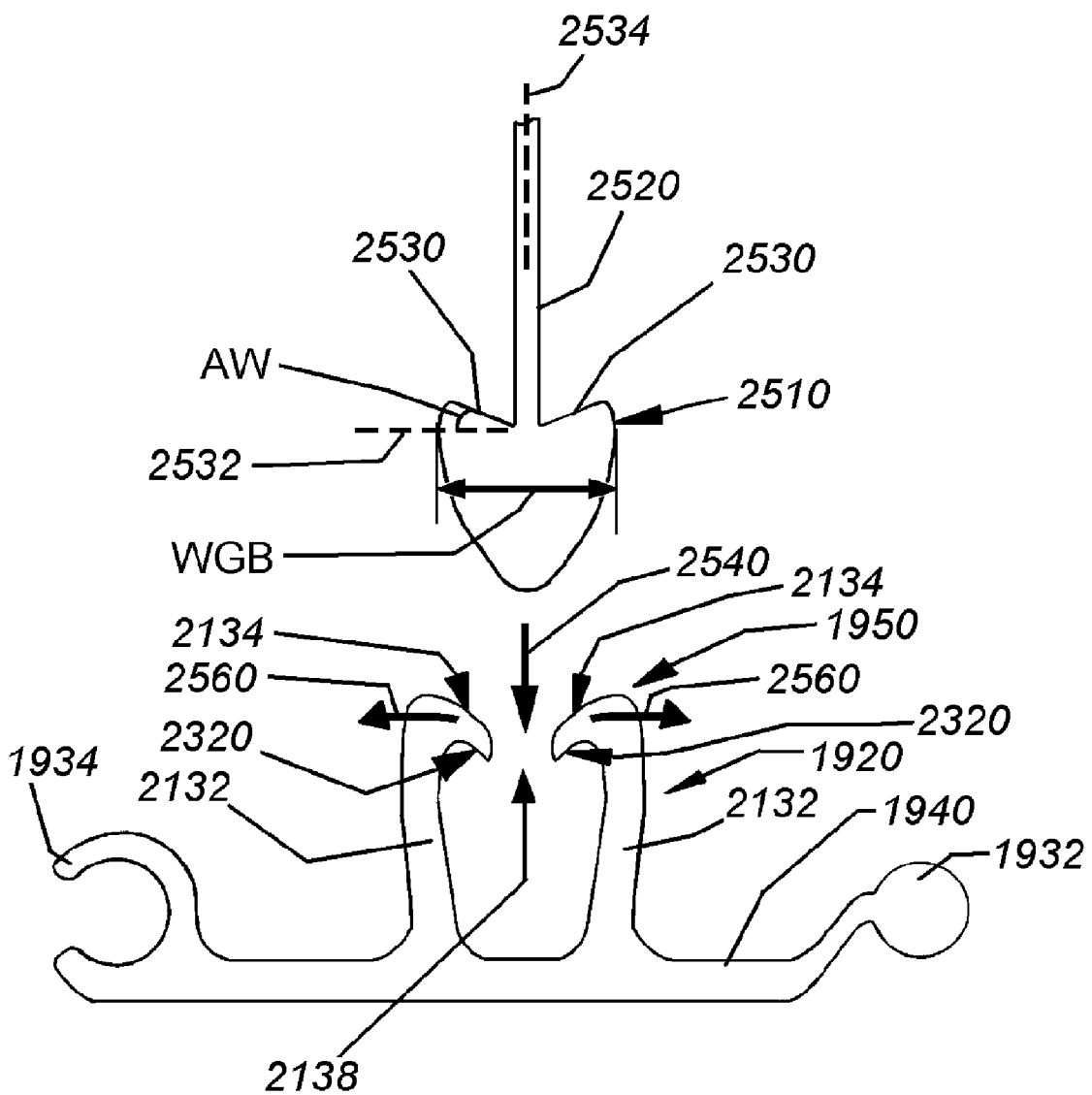
FIG. 25 is a side view of the illustrative clip of FIG. 19 showing the insertion thereinto an of exemplary listing of an upholstery piece.
Figure 26:
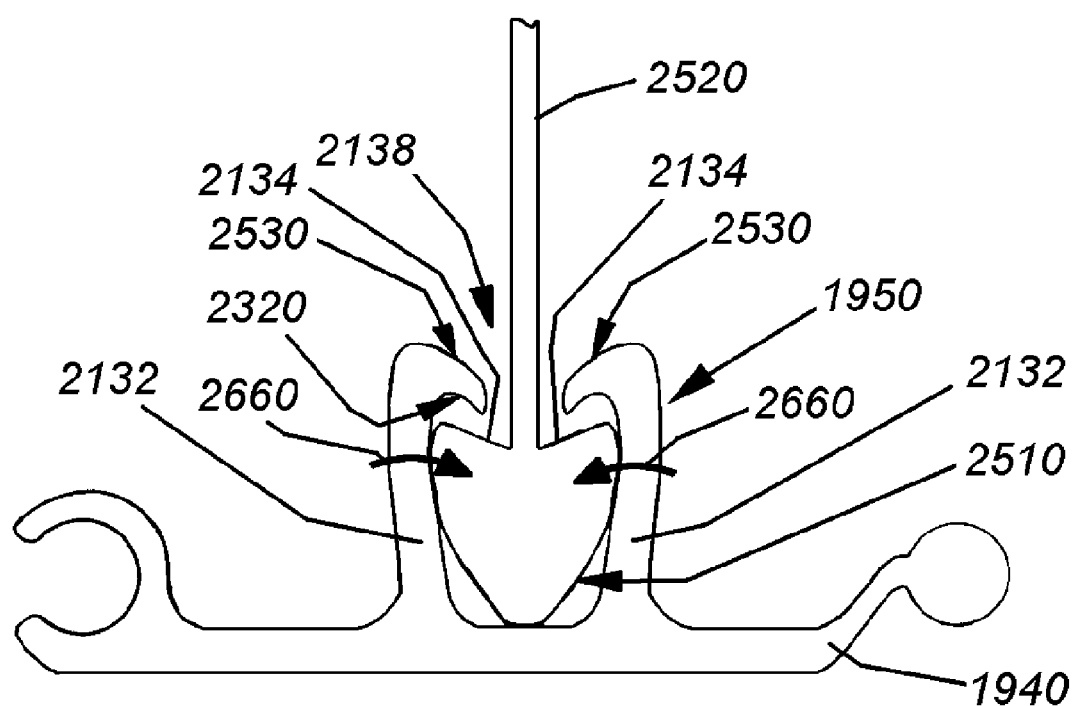
FIG. 26 is a side view of the resulting interconnection of the clip and listing as shown in FIG. 25.

FIGS. 25 and 26 show the installation of a typical listing bead into a low-profile clip in accordance with this embodiment. In FIG. 25, the listing bead 2510 is attached at the end of a web 2520 which is, itself, attached to an overlying upholstery piece (not shown). The novel listing bead 2510 of this embodiment can be formed as a continuous extrusion from an acceptable polymer (polypropylene, for example), and includes a pair of upper walls 2530 that are defined at an approximate angle AW with respect to the horizontal line 2532. As noted above, the angle AW of the barb-engaging faces 2530 of the bead is "married" to the general angle of the bottom faces 2320 of the barbs 2134. The marriage of angles helps to increase pull-out force and reduce the tendency of the legs to flex open when the bead is placed under tension. This horizontal line 2532 is generally perpendicular to the direction of the web 2520 as indicated by the dash line 2532. This horizontal line is also generally parallel to the direction of extension of the plane of the base 1940 of the clip 1920. During assembly, the listing is driven downwardly (arrow 2540) toward the gap 2138 between the clip member legs 2132. The maximum width WGB of the listing bead is wider than the gap 2138 between the barbs 2134. Thus, the listing bead deforms slightly as its rounded lower faces pass through the barbs and the reduced thickness legs flex outwardly (outward arrows 2560) in response to the pressure applied by the bead as it engages the rounded ends of the barbs. In FIG. 26, the bead 2510 has passed fully through the gap 2138 and come to rest (bottomed-out) against the base. So long as the central region is high enough to allow the upper walls 2530 of the bead to clear the bottom faces 2320 of the barbs, 2134, then the legs 2132 are allowed to flex back (inward arrows 2660) into their original shape. After installation, the natural tension placed upon the attached upholstery covering will generally bias the upper walls 2530 of the listing into firm engagement with the bottom faces 2320 of the barbs 2134. This tension, and the relatively close conformance of widths of the clip central region and bead (as shown in FIG. 26), ensures a rattle-free interconnection.

In summary, the above-described low-profile clip, in a single assembly, ganged assembly or festooned arrangement, provides superior installation and service life performance in a lower-height geometry. Through the application of predetermined dimensions and use of specific materials such a high performance, low-profile clip can be achieved and mass-manufactured at a reasonable cost.

The foregoing has been a detailed description of illustrative embodiments of the invention. Various modifications and additions can be made without departing from the spirit and scope if this invention. Each of the various embodiments described above may be combined with other described embodiments in order to provide multiple features. In particular the illustrative low-profile clip member can be combined with any of the other implementations and arrangements shown and described herein. Furthermore, while the foregoing describes a number of separate embodiments of the apparatus and method of the present invention, what has been described herein is merely illustrative of the application of the principles of the present invention. For example, while clips can be constructed from a material that readily bonds to liquid foam, in alternate embodiments, all or part of the clip material can be relatively inert to foam and bonded by alternate mechanisms, such as adhesives or mechanical anchoring. In addition, it is expressly contemplated that any of the storage techniques, festooning arrangements and connector structures described above can be applied to clips of any number of ganged clip members (e.g. single, dual-ganged, triple ganged, etc.). Also, while clip members are joined by unitary segments of predetermined length according to illustrative embodiments, it is expressly contemplated that the segment connectors between clip members in a multi-ganged clip arrangement can be completely or partially removable from the clip members in the arrangement. As such, the segments can be variably sized to allow adjustment of the spacing between ganged clip members. Likewise, the clip members can be provide as a multi-piece unit with the clip legs (being possibly more durable) being a separate material with respect to the base (being possibly more-reactive to foam). Alternatively, a unitary clip with a multiplicity of co-molded or co-extruded materials can be formed. Furthermore, while male and female connectors in the depicted embodiments are generally cylindrical so as to facilitate angular rotation between adjoining clips, in alternate embodiments (where angular rotation is not desired) the connectors can each define a conforming, nesting, non-circular cross section (such as an oval, polygon, etc.). In such an embodiment, clips would be urged to maintain a predetermined angular orientation with respect to each other. This may be desirable for storage implementations, such as the box of FIG. 7. The cross-sectional shape of a listing bead for use with any of the clip members of this invention can also be widely variable. Moreover, while a particular male and female connector are provided to each clip member in the illustrative embodiments, the general term "connector" should be taken broadly to include genderless connectors that freely interconnect with each other regardless of orientation. Furthermore, where ranges of values are specified, they are to be taken in connection with other specified values. Where the scale of the clip is increased or decreased to accommodate differing applications than those discussed herein, the nominal values for clip dimensions may generally increase or decrease in proportion to the respective increase or decrease in the clip's overall scale. In addition, the term "approximately" as used herein to refer to various clip dimensions is meant to include reasonable variations beyond the ranges specified that are found to provide reasonable performance to the clip. Accordingly, this description is meant to be taken only by way of example, and not to otherwise limit the scope of this invention.

What is claimed is:

1. A low-profile clip adapted to secure a bead to a foam substrate comprising:
   a base;
   a pair of legs extending upwardly from the base and defining therebetween a central region constructed and arranged to capture the bead, each of the legs including a top barb that defines a gap narrower than the central region;
   wherein the legs each extend upwardly along an inner leg wall from a horizontal plane taken through the base at a first angle of between approximately 80 and 85 degrees and therefrom to each of the respective barbs at a second angle, with respect to an elevated plane at a predetermined height above, and parallel to, the horizontal plane taken through the base, of between approximately 88 and 90 degrees measured along an outer leg wall, and wherein each of the legs has a thickness taken along a direction parallel to the horizontal plane of between approximately 1.0 and 2.0 millimeters, wherein each of the legs has a base root having respective fillets interconnected between each leg and the base and a substantially uniform thickness between the fillets and the top barb for increased strength, and wherein the top barb is free of outward extensions;
   each said fillet formed as a concave radius and said respective fillets including an inner base fillet and an outer base fillet;
   said barb having a single flat angled top surface, an inner top round-over forming a terminating end of the barb and an outer top radius;
   said outer top radius extending between said outer leg wall and said single flat angled top surface;
   said outer top radius being comparable in magnitude to that of the inner top round-over;
   wherein the clip defines an overall maximum height from tops of the legs to a bottom of the base of approximately 10 millimeters or less.

2. The clip as set forth in claim 1 wherein the predetermined height is between approximately 4.0 and 5.0 millimeters and the gap spans a distance of between approximately 1.2 and 3.0 millimeters.

3. The clip is set forth in claim 1 wherein a bottom surface of each of the barbs defines an angle that is approximately the same as an angle of a respective engaging surface of the bead.

4. The clip as set forth in claim 3 wherein the angle of the bottom surface of each of the barbs is between approximately 20 and 35 degrees with respect to a reference plane parallel to the horizontal plane taken through the base.

5. The clip as set forth in claim 3 wherein the clip is stored on a spool interconnected to the other clip base in a festooned arrangement.

6. The clip as set forth in claim 1 wherein the clip is constructed from a blended polycarbonate material including an impact modifier.

7. The clip as set forth in claim 1 wherein the base includes a segment that is constructed and arranged to interconnect to another clip so as to be formed as a ganged clip assembly.

8. The clip as set forth in claim 7 wherein the base includes a first connector on a first end and a second connector on an opposing second end, the first connector constructed and arranged to receive and removably interconnect with a third connector mounted on an another clip base so as to provide a festooned arrangement of interconnected clips; said base including opposed interconnecting support segments of uniform thickness disposed between the leg and connector so that the respective connectors are substantially spaced apart the thickness of each support segment being comparable to the thickness of each leg.

9. The clip as set forth in claim 1 wherein the base includes a first connector on a first end and a second connector on an opposing second end, the first connector constructed and arranged to receive and removably interconnect with a third connector mounted on an another clip base so as to provide a festooned arrangement of interconnected clips; said base including opposed interconnecting support segments of uniform thickness disposed between the leg and connector so that the respective connectors are substantially spaced apart the thickness of each support segment being comparable to the thickness of each leg.

10. The clip as set forth in claim 9 wherein the first connector and the third connector each comprise a male cylinder and the second connector defines a female inner semi-cylindrical surface having an inner diameter that conforms to an outer diameter of the male cylinder, the female inner semi-cylindrical surface including a gap constricted and arranged to provide clearance from a connector base that supports the male cylinder.

11. The clip as set forth in claim 10 wherein the connector base and the gap are each sized and arranged to allow the base to rotate angularly with respect to the other clip base.

12. The clip as set forth in claim 10 wherein the clip is stored in a box interconnected to the other clip base in a festooned arrangement.

13. The clip assembly as set forth in claim 1 wherein each of the barbs has a bottom flat surface extending at an angle to the horizontal and an inside radius; said inside radius extending between the inner wall of the leg and the bottom flat surface; said bottom flat surface extending between said inside radius and said inner top round-over.

14. The clip as set forth in claim 13 wherein the outer top radius and the single angled top surface are the only surfaces at the top of the barb.

15. The clip as set forth in claim 1 wherein the bead comprises a listing bead that is interconnected to an upholstery fabric covering.

16. A low-profile clip adapted to secure a bead to a foam substrate comprising;
   a base that includes a connector extending outwardly horizontally from the base, the connector being constructed and arranged to allow the base to rotate angularly with respect to an other clip base when removably interconnected to the other clip base;
   a pair of legs extending upwardly from the base and defining therebetween a central region constructed and arranged to capture the bead, each of the legs including a top barb that defines a gap narrower than central region;
   said base including opposed interconnecting support segments of uniform thickness disposed between the leg and connector so that the respective connectors are spaced apart;
   the thickness of each support segment being comparable to the thickness of each leg;
   wherein the legs each extend upwardly from a horizontal plane taken through the base at a first angle and therefrom to each of the respective barbs at a second angle, with respect to an elevated plane at a predetermined height above, and parallel to, the horizontal plane taken through the base, and wherein each of the legs has a substantially constant thickness therealong;
   each of the legs has a base root having respective fillets interconnected between each leg and the base and a substantially uniform thickness between the fillets and the top barb for increased strength;
   each said fillet formed as a concave radius and said respective fillets including an inner base fillet and an outer base fillet;
   each of said fillets formed as concave junction between respective leg walls and the base;
   wherein the legs, and at least a portion of the base disposed between the legs, is constructed from a blended polycarbonate material including an impact modifier; and
   wherein the clip defines an overall maximum height from tops of the legs to a bottom of the base of approximately 10 millimeters or less.

17. A clip assembly including a plurality of clips in the assembly, each being adapted to secure a bead to a foam substrate comprising:
   at least one dual-ganged clip including first and second opposed clip members joined by an elongated shaft segment that spacedly disposes the first and second opposed clip members apart;
   a first clip member base with first clip legs constructed and arranged to secure a bead thereinto, extending from the first clip member base at a first angle of between approximately 80 and 85 degrees and therefrom to each of respective barbs at a second angle, with respect to an elevated plane at a predetermined height above, and parallel to, the horizontal plane taken through the base, of between approximately 88 and 90 degrees, and the first clip member base having opposing first base ends oriented along a direction of grouping elongation;
   a first connector and a second connector mounted at each of the opposing first base ends;
   a second clip member base with second clip legs constructed and arranged to secure the bead thereinto, extending from the second clip member base, and the second clip member base having opposing second base ends oriented along a direction of grouping elongation;
   a third connector and a fourth connector mounted at each of the opposing second base ends;
   wherein the first connector is constructed and arranged to removably engage the fourth connector and to allow the second clip member base to rotate angularly with respect to the first clip member base; and
   wherein each of the first clip member base and first clip legs together define a clip having an overall maximum height from a bottom of the first clip member base to a top of the legs of 10 millimeters and wherein each of the second clip member base and second clip legs together define a clip having an overall maximum height from a bottom of the second clip member base to a top of the legs of 10 millimeters;
   wherein each of the legs has a base root having respective fillets interconnected between each leg and the base, each said fillet formed as a concave radius and said respective fillets including an inner base fillet and an outer base fillet;
   and wherein each of said fillets is formed as concave junction between respective leg walls and the base.

18. The clip assembly as set forth in claim 17 wherein each said base includes opposed interconnecting support segments of uniform thickness disposed between the leg and connector so that the respective connectors are spaced apart and the thickness of each support segment is comparable to the thickness of each leg.

19. The clip assembly as set forth in claim 18 wherein the length of the support segment is longer than the width of the support segment.

20. The clip assembly as set forth in claim 17 wherein said barb has a single flat angled top surface, an inner top round-over forming a terminating end of the barb and an outer top radius; said outer top radius extending between said outer leg wall and said single flat angled top surface; and said outer top radius being comparable in magnitude to that of the inner top round-over.

21. The clip assembly as set forth in claim 20 wherein each of the barbs has a bottom flat surface extending at an angle to the horizontal and an inside radius; said inside radius extending between the inner wall of the leg and the bottom flat surface; and
   said bottom flat surface extending between said inside radius and said inner top round-over.

22. The clip as set forth in claim 21 wherein the outer top radius and the single angled top surface are the only surfaces at the top of the barb.

23. The clip assembly as set forth in claim 17 wherein the elongated shaft segments of respective one and another dual-ganged clips extend in parallel and each have opposed ends that extend in a direction between facing side surfaces of respective first and second clip member bases.

24. The clip assembly as set forth in claim 23 wherein the elongated shaft segments have a length greater than a width of the clip member base to assist in grasping the clip at the elongated shaft segment and each elongated shaft segment connects to the clip member base at the facing side surface thereof.

25. The clip assembly as set forth in claim 24 wherein the length of each elongated shaft segment is an order of magnitude greater than the clip member base width.

26. The clip assembly as set forth in claim 17 wherein the first connector and the second connector extend outwardly from a central portion of the first base member to each of the opposing first base ends along the first direction of grouping elongation, such that the first connector and the second connector are disposed outwardly beyond the first clip legs and the first clip barbs along the first direction of grouping elongation so that the first clip member is allowed to angularly deflect about a respective rotational axis relative to an adjacent clip member.

27. The clip assembly as set forth in claim 17 wherein the first connector comprises a male connector for the first clip member base, and the male connector is arranged on a pair of outwardly extending side braces that define an opening between a central portion of the first clip member base and the male connector.

28. The clip assembly as set forth in claim 27 wherein the opening is sized and arranged so that, when a female connector is attached to the male connector, the female connector rides within the opening.

29. The clip assembly as set forth in claim 27 wherein relative arrangement of the first connector and the second connector allows a plurality of connected clip members to bend relative angles in excess of 90 degrees.

30. The clip assembly as set forth in claim 17 wherein each of the clip members are adapted to be mounted on rails in a mold cavity such that, as liquid foam is introduced to the mold cavity, the rails define trenches within the foam and the clip members reside in the trenches with gaps between their respective clip legs exposed for insertion of a listing.

* * * * *